United States Patent [19]

Ito et al.

[11] Patent Number: 5,243,526

[45] Date of Patent: Sep. 7, 1993

[54] OUTPUT CONTROL APPARATUS FOR VEHICLE

[75] Inventors: Masayoshi Ito; Tomohiro Narita, both of Okazaki; Katsunori Otake; Kiichi Yamada, both of Nagoya; Yasunobu Miyata, Komaki, all of Japan

[73] Assignee: Mitsubishi Jidosha Kogyo Kabushiki Kaisha, Tokyo, Japan

[21] Appl. No.: 697,215

[22] Filed: May 7, 1991

[30] Foreign Application Priority Data

May 18, 1990 [JP] Japan .................................. 2-127009
May 18, 1990 [JP] Japan .................................. 2-127014

[51] Int. Cl.$^5$ ............................................ B60K 28/16
[52] U.S. Cl. ........................... 364/426.02; 364/426.03; 180/197
[58] Field of Search ...................... 364/426.02, 426.03; 180/197; 303/99, 97, 103, 105

[56] References Cited

U.S. PATENT DOCUMENTS

| | | | |
|---|---|---|---|
| 4,760,893 | 9/1988 | Sigi et al. | 180/197 |
| 4,763,263 | 8/1988 | Leiber | 364/426.03 |
| 4,886,140 | 12/1989 | Leiber et al. | 180/197 |
| 4,900,100 | 2/1990 | Higashimata et al. | 364/426.02 |
| 5,012,417 | 4/1991 | Watanabe et al. | 364/426.02 |
| 5,070,460 | 12/1991 | Yasuno | 180/197 |

FOREIGN PATENT DOCUMENTS

| | | |
|---|---|---|
| 338538 | 10/1989 | European Pat. Off. . |
| 3635095 | 4/1987 | Fed. Rep. of Germany . |
| 3546575 | 10/1987 | Fed. Rep. of Germany . |
| 3906680 | 9/1989 | Fed. Rep. of Germany . |
| 2222703 | 3/1990 | United Kingdom . |

Primary Examiner—Gary Chin

[57] ABSTRACT

An output control apparatus for a vehicle which includes a torque reduction device for reducing driving torque of an engine independent of manipulation by the driver and a filter device for outputting a corrected longitudinal direction acceleration, varying according to changes in longitudinal direction acceleration of the vehicle body with a predetermined delay time and maintaining the output during a speed shift above the value immediately before the speed shift. A reference torque setting device is further included for setting a reference driving torque according to a slip amount of the driving wheels. A target driving torque setting device is also included for correcting the reference driving torque according to the slip amount of the driving wheels to set a target driving torque. Finally, a torque control unit is included for controlling operation of the torque reduction device so that the driving torque is that of the target driving torque set by the target driving torque setting device, thereby preventing a stalling feeling of the vehicle immediately after the speed shift, and improving the acceleration feeling.

34 Claims, 26 Drawing Sheets

| Speed | $\rho_{KI}$ | $\rho_{KP}$ | $\rho_T$ |
|---|---|---|---|
| 1st speed | 1.0 | 1.0 | 1.0 |
| 2nd speed | 0.7 | 0.7 | 1.5 |
| 3rd speed | 0.7 | 0.7 | 1.5 |
| 4th speed | 0.7 | 0.7 | 1.5 |
| Reverse | 1.0 | 1.0 | 1.0 |

OUTPUT CONTROL APPARATUS FOR VEHICLE

BACKGROUND OF THE INVENTION

This invention relates to an output control apparatus, for a vehicle, which rapidly reduces driving torque of an engine according to an amount of slippage of the driving wheels, hereinafter referred to as slip amount, occurring during acceleration or the like, of the vehicle, thereby ensuring safe running of the vehicle.

When the road surface condition abruptly changes during operation of a vehicle, or when a vehicle is operating on a slippery road with a low frictional coefficient such as a road covered with snow or a frozen road, the driving wheels may often skid.

In such a case, it is difficult for even a skilled driver to adjust the amount of pressure applied to an acceleration pedal and delicately control the engine output to prevent the driving wheels from skidding.

To prevent this, an output control apparatus can be used which detects a skidding condition of the driving wheels. When skidding of the driving wheels occurs, the output control apparatus forcibly reduces the output of the engine independent of the amount of pressure applied to the accelerator pedal by the driver. Further, an apparatus is proposed which allows a selectable operating mode using the output control apparatus, or a normal operating mode, in which the output of the engine is controlled according to the amount of pressure applied to the accelerator pedal, selectable by the driver as necessary.

As an output control method according to this concept, an apparatus is known which detects, for example, a rotation speed of the driving wheels and a rotation speed of the driven wheels. It regards a difference in the rotation speed between the driving and the driven wheels as a slip amount. It then sets a target driving torque according to the slip amount and the operating condition of the vehicle, and controls the throttle valve opening and ignition timing so that the driving torque of the engine is that of the target driving torque.

In a prior art output control apparatus like this, when a reference driving torque of the engine is set according to the traveling speed of the vehicle, the lower peripheral speed of the right and left driven wheels is adopted as a traveling speed of the vehicle, and the reference driving torque is set according to this speed.

In a prior art output control apparatus of a type in which a reference driving torque is set according to changes in vehicle body acceleration, a target driving torque of the engine is set according to the reference driving torque and the slip amount of the driving wheels. The driving torque of the engine is controlled so that the driving torque of the engine is the target driving torque. Since the vehicle body acceleration tends to decrease during a speed shift, the reference driving torque is corrected to a smaller value, and an acceleration feeling, occurring immediately after completion of speed shift, tends to be deteriorated.

In particular, under a condition where the driving torque of the engine is decreased, independent of the driver's manipulation, since, of course the target driving torque of the engine is decreased, an acceleration occurring feeling immediately after completion of a speed shift is almost lost, with the vehicle arriving at a stalling condition.

OBJECT OF THE INVENTION

With a view toward obviating the defects of the known output control apparatus for a vehicle, it is one primary object of the present invention to provide an output control apparatus for a vehicle which prevents a stalling feeling of the vehicle immediately after completion of a speed shift, to improve an acceleration feeling.

This and further objects of the present invention will become more readily apparent from a better understanding of the preferred embodiments as described hereinafter, with reference to the drawing figures.

SUMMARY OF THE INVENTION

When a vehicle is operating at a speed other than an extremely low speed, its driving wheels are more or less slipping relative to the road surface. However, when a driving torque greater than a frictional force between the road surface and the driving wheels is applied, the slip amount of the driving wheels rapidly increases, making it difficult to control the vehicle. This is known experientially.

From the above fact, in order to effectively utilize the driving torque generated by the engine and in order to prevent the driving wheels from slipping, which makes difficult to control the vehicle, it is desirable that the driving torque of the engine be controlled so that the driving torque of the engine does not exceed the maximum frictional force between the road surface and the driving wheels by too much.

Thus, to effectively utilize the driving torque of the engine, as shown in FIG. 13 which shows a relationship between a slip rate S of tires and a frictional coefficient between the tires and the road surface, the slip amount of the driving wheels is adjusted so that the slip rate S of the tires of driving wheels during operation is that of a target slip rate So corresponding to the maximum value of frictional coefficient between the tires and the road surface or a smaller value within its vicinity. This thereby minimizes an energy loss and does not deteriorate the driving performance and acceleration performance of the vehicle.

Where V is a vehicle speed, and $V_D$ is a peripheral speed of the driving wheels, the slip rate S of the tires is given as $$S = \frac{V_D - V}{V}$$

and the driving torque of the engine may be set so that the slip rate S is the slip rate $S_O$ corresponding to the maximum value of the frictional coefficient between the tires and the road surface, or a smaller value within its vicinity.

The output control apparatus for a vehicle according to the present invention, based on the above findings, comprises: torque reduction means for reducing driving torque independent of manipulation by the driver; operating speed detecting means for detecting an operating speed of a vehicle; reference torque setting means for calculating a longitudinal direction of acceleration of a vehicle body from a detected operating speed of the vehicle to set to set a reference driving torque; target torque setting means for correcting the reference driving torque according to a slip amount of the driving wheels to set a target driving torque; and a torque control unit for controlling operation of the torque reduction means so that actual driving torque is equal to the target driving torque set by the target driving torque setting means; characterized by filter means for outputting a corrected longitudinal direction acceleration varying with a predetermined delay time according to changes in the longitudinal direction acceleration and for maintaining an output during a shift of a power transmission apparatus above the value immediately preceeding the shift, the reference driving torque setting means setting the reference driving torque according to the corrected longitudinal direction acceleration.

The torque reduction means for reducing the driving torque of the engine can be one which retards the ignition timing, one which reduces intake air amount or fuel supply, one which interrupts fuel supply, or, as a specific one, one which reduces the compression ratio of the engine.

Therefore, a corrected longitudinal direction acceleration, which varies according to changes in the longitudinal acceleration of the vehicle body with a predetermined delay time, is outputted from the filter means to the reference driving torque setting means. The reference driving torque setting means sets a driving torque as a reference of the engine according to the corrected longitudinal direction acceleration, and outputs it to the target driving torque setting means. The target driving torque setting means corrects the reference driving torque, set by the reference driving torque setting means, according to a slip amount of the driving wheels to set a driving torque as a target for the engine. It then outputs it to the torque control unit.

When the target driving torque of the engine is outputted from the target driving torque setting means to the torque control unit, the torque control unit controls operation of the torque reduction means so that the driving torque of the engine is the target driving torque. This thereby reduces the driving torque of the engine as is necessary, independent of the driver's manipulation.

Since the filter means maintains the output of the reference driving torque during a speed shift, above a value immediately preceeding the beginning of the speed shift, the reference driving torque is maintained at a value of at least the reference driving torque at the beginning of the speed shift, or an increased value. This improves the acceleration feeling of the vehicle immediately after completion of the speed shift.

As a result, for example, even when the vehicle is operating on a curved road of a small curvature radius, such as turning to the right or left at crossroads or the like, acceleration performance of the vehicle will not be impaired.

Brief Description of the Drawings

The present invention will become more fully understood from the detailed description given hereinbelow and the accompanying drawings which are given by way of illustration only, and thus are not intended to be limitative of the present invention and wherein.

The above-mentioned drawings will be described in detail in the following detailed description.

DETAILED DESCRIPTION OF THE PREFERRED EMBODIMENT

Figure 1:
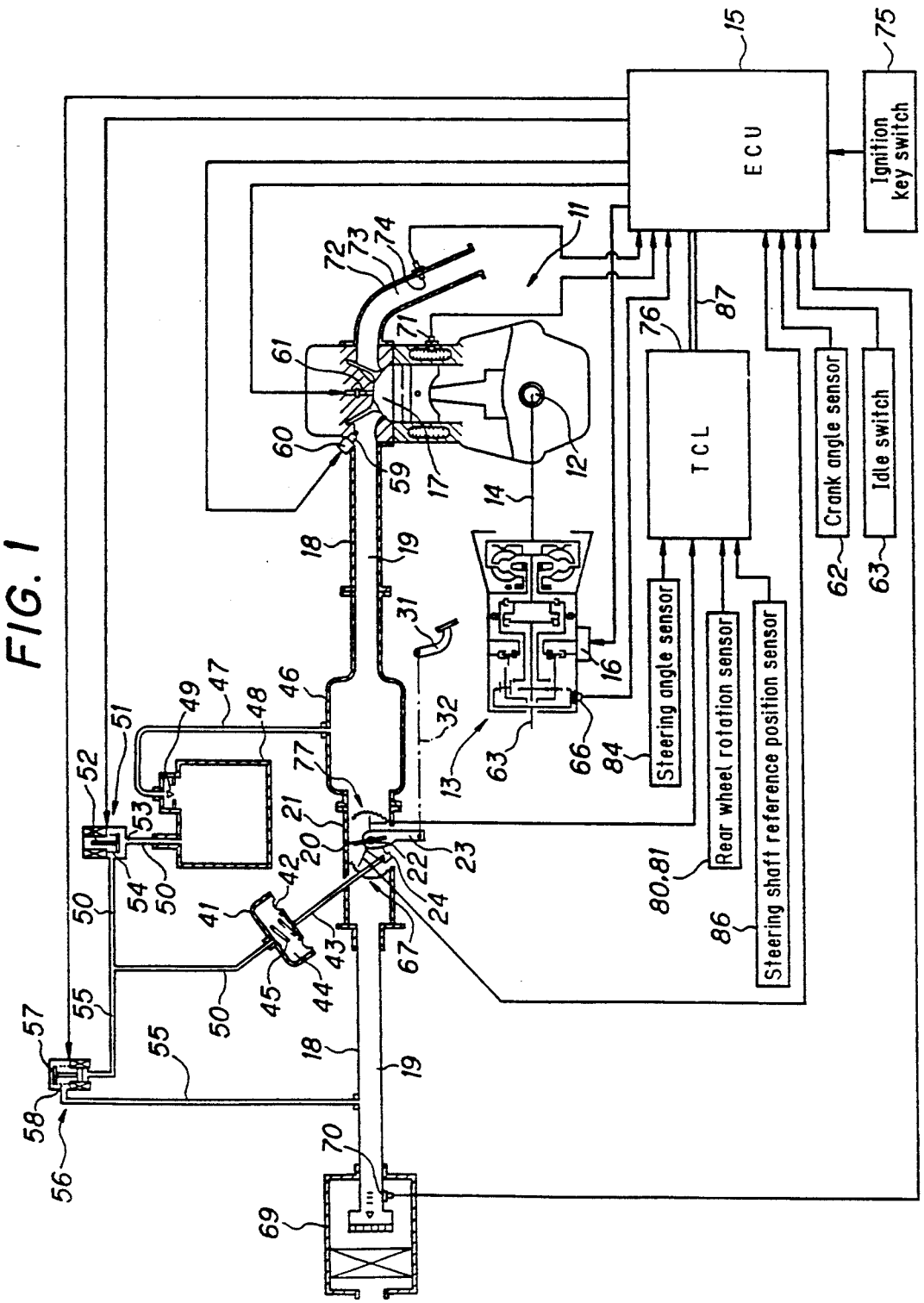
FIG. 1 is a schematic view of an embodiment of the output control apparatus for a vehicle according to the present invention applied to a front-wheel-drive vehicle incorporated with a hydraulic automatic transmission of four forward speeds and a single reverse speed.
Figure 2:
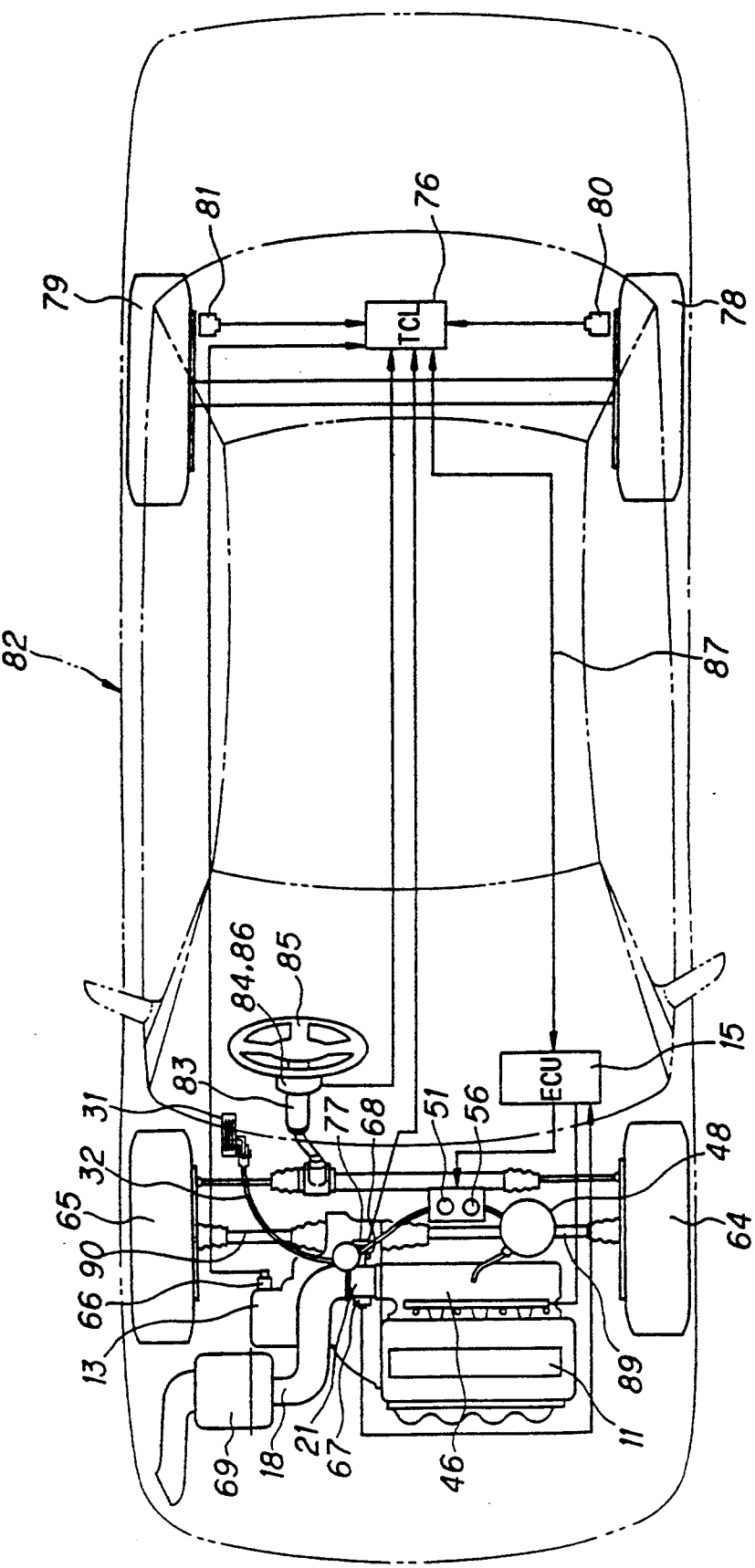
FIG. 2 is a schematic view showing the vehicle structure.

As shown in FIG. 1, which is a schematic view showing an embodiment in which the turning control apparatus according to the present invention is applied to a front-wheel-drive vehicle incorporated with a hydraulic automatic transmission of four forward speeds and a single reverse speed, and FIG. 2 which is a schematic view of the vehicle, input shaft 14 of hydraulic automatic transmission 13 is connected to output shaft 12 of engine 11. Hydraulic automatic transmission 13 automatically selects a desired speed through a hydraulic control device, according to an instruction from engine unit 15 (hereinafter referred to as ECU) for controlling operation condition of engine 11 according to the position of a select lever (not shown) selected by the driver and operation condition of the vehicle. Detailed structure and functions of hydraulic automatic transmission 13 have already been described, for example, in Japanese Patent Publication Laid-open 58-54270/1983 and Japanese Patent Publication Laid-open 61-31749/1986. Hydraulic control device 16 incorporates a pair of shift control electromagnetic valves (not shown) for engaging and releasing a plurality of frictional engaging elements forming part of hydraulic automatic transmission 13. Further, ECU 15 controls ON/OFF operation of current to these shift control electromagnetic valves to achieve smooth shift operation to a gear of the four forward speeds and the single reverse speed.

In this embodiment, the opening of throttle valve 20 is controlled by accelerator pedal 31 and actuator 41 simultaneously. However, alternatively, two throttle valves may be connected in series in air intake passage 19, one throttle valve connected to only accelerator pedal 31 and the other throttle valve connected to only actuator 41, so that these throttle valves are controlled independently of one another.

Figure 3:
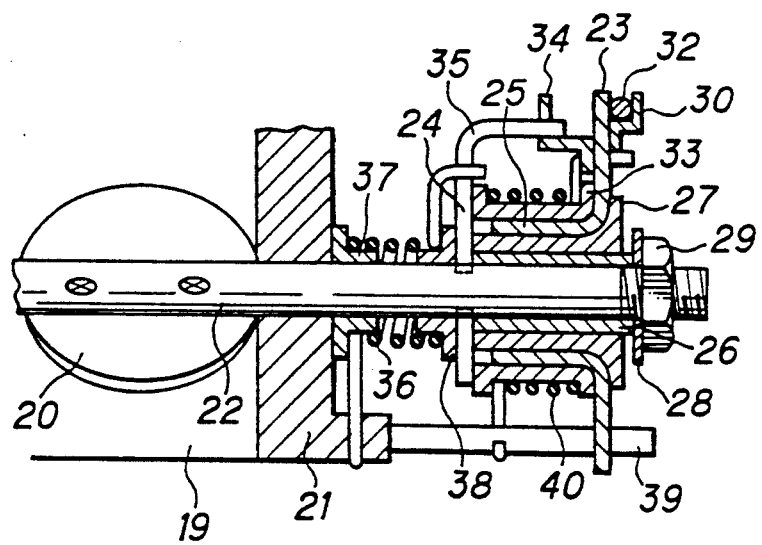
FIG. 3 is a schematic cross sectional view showing a drive mechanism of the throttle valve of the output control apparatus of FIG. 1.

Halfway through air intake pipe 18, connected to combustion chamber 17 of engine 11, is disposed throttle body 21 incorporating throttle valve 20. Throttle body 21, including throttle valve 20, varies the opening of air intake passage 19, formed by air intake pipe 18, and controls the amount of intake air supplied into combustion chamber 17. As shown in FIG. 1 and FIG. 3, FIG. 3 being a schematic enlarged view of the cross sectional structure of cylindrical throttle body 21, both ends of throttle shaft 22, integrally fixed within throttle valve 20, are rotatably supported on throttle body 21. One end of throttle shaft 22, protruding into air intake passage 19, is coaxially engaged with accelerator lever 23 and throttle lever 24.

Between throttle shaft 22 and the cylindrical portion 25 of accelerator lever 23, are disposed bushing 26 and spacer 27, whereby the accelerator lever 23 is rotatable with respect to the throttle shaft 22. Furthermore, with washer 28 and nut 29 mounted to one end of throttle shaft 22, accelerator lever 23 is prevented from coming out of throttle shaft 22. Moreover, cable receiver 30, which is integral with accelerator lever 23, is connected through cable 32 with accelerator pedal 31, which is operated by the driver. The accelerator lever 23 is rotated with respect to throttle shaft 22 according to the amount of pressure applied to accelerator pedal 31.

Throttle lever 24 is integrally mounted to throttle shaft 22. By operating throttle lever 24, throttle valve 20 is rotated with throttle shaft 22. Cylindrical portion 25 of the accelerator lever 23 is coaxially and integrally engaged with collar 33. At a front end of throttle lever 24 stopper 35 is formed, which can be stopped by claw 34 formed as part of collar 33. Claw 34 and stopper 35 are set to relative positions so that they are engaged with each other when throttle lever 24 is rotated in a direction to open throttle valve 20, or, when accelerator lever 23 is rotated in a direction to close throttle valve 20.

Between throttle body 21 and throttle lever 24 is disposed a torsion coil spring 36 which pushes stopper 35 of throttle lever 24 against claw 34 of collar 33, integral with the accelerator lever 23. It urges throttle valve 20 in the opening direction, through a pair of cylindrical spring receivers 37 and 38 engaged with throttle shaft 22, coaxially with throttle shaft 22. Also, between stopper pin 39 protruding from throttle body 21 and accelerator lever 23, torsion coil spring 40 is disposed. Coil spring 40 pushes claw 34 of the collar 33 against stopper 35 of throttle lever 24 and urges throttle valve 20 in the closing direction. This creates a detent feeling to accelerator pedal 31, mounted to cylindrical portion 25 of accelerator lever 23 through collar 33 and coaxially with throttle shaft 22.

The front end of throttle lever 24 is connected to a front end of control bar 43, of which the rear end is mounted to diaphragm 42 of actuator 41. Pressure chamber 44 formed in actuator 41 is incorporated with compression coil spring 45 which, together with torsion coil spring 36, pushes stopper 35 of throttle lever 24 to claw 34 of accelerator lever 23 and urges throttle valve 20 in the opening direction. Further, the force of torsion coil spring 40 is set greater than the sum of the forces of two springs 36 and 45, whereby throttle valve 20 is not opened unless accelerator pedal 31 is pressed down.

Surge tank 46, connected at the downstream side of throttle body 21 and forming part of air intake passage 19, communicates with vacuum tank 48 through connection piping 47. Between vacuum tank 48 and connection piping 47 is disposed check valve 49 which allows air to move only from vacuum tank 48 to surge tank 46. This sets the pressure in vacuum tank 48 to a value nearly same as a minimum pressure of surge tank 46.

The vacuum tank 48 and pressure chamber 44 of actuator 41 communicate with each other through piping 50. A first torque control electromagnetic valve 51, which closes when unenergized, is provided halfway through piping 50. Thus, torque control electromagnetic valve 51 incorporates spring 54 which urges plunger 52 to valve seat 53, to close piping 50.

Piping 50, between first torque control electromagnetic valve 51 and actuator 41, is connected with piping 55 which communicates with air intake passage 19 at the upstream side of throttle valve 20. Second torque control electromagnetic valve 56, which opens when unenergized, is deposed halfway through piping 55.

Thus, torque control electromagnetic valve 56 incorporates spring 58 which urges plunger 57 to open piping 55.

Two torque control electromagnetic valves 51 and 56 are individually connected to ECU 15. Their ON/OFF operation is duty-controlled by instructions from ECU 15, forming a torque reduction device of the present invention.

For example, when the duty ratio of torque control electromagnetic valves 51 and 56 is 0%, the pressure of pressure chamber 44 of actuator 41 is that of atmospheric pressure. This is nearly same as the pressure in air intake passage 19 at the upstream side of throttle valve 20. Further the opening of throttle valve 20 directly corresponds to the amount of pressure applied to the accelerator pedal 31. To the contrary, when the duty ratio of torque control electromagnetic valves 51 and 56 is 100%, pressure chamber 44 of actuator 41 becomes a negative pressure almost same as vacuum tank 48. Control bar 43 is pulled up to the left, throttle valve 20 is closed independently of the amount of pressure applied to the accelerator pedal 31. Thus, the driving torque of engine 11 is forcibly reduced. Thereby, the duty ratio of torque control electromagnetic valves 51 and 56 can be controlled to vary the opening of throttle valve 20, independent of the amount of pressure applied to the accelerator pedal 31, and thus control the driving torque of engine 11.

In this embodiment, the opening of throttle valve 20 is controlled by the accelerator pedal 31 and the actuator 41 simultaneously. However, alternatively, two throttle valves may be connected in series in air intake passage 19, one throttle valve connected to only accelerator pedal 31 and the other throttle valve connected to only actuator 41. Thus, these throttle valves may be controlled independently of one another.

At the downstream end side of air intake pipe 18, fuel injection nozzles 59 of a fuel injection device to inject fuel (not shown) into combustion chamber 17 of engine 11 are provided to the individual cylinders (this embodiment assumes a 4-cylinder internal combustion engine). These are supplied with fuel through electromagnetic valve 60, with the duty controlled by ECU 15. Thus, the amount of fuel supplied to combustion chamber 17 is controlled by controlling the opening time of electromagnetic valve 60 to a predetermined air/fuel ratio. The fuel is then ignited by ignition plug 61 in the combustion chamber 17.

ECU 15 is connected to crank angle sensor 62 which is mounted to engine 11 to detect the rotation speed of the engine; front wheel rotation sensor 66 which detects the rotation speed of output shaft 63 of hydraulic automatic transmission apparatus 13 to calculate an average peripheral speed of a pair of front wheels 64 and 65 which are driving wheels; throttle opening sensor 67 which is mounted to throttle body 21 to detect the opening of throttle lever 24; idle switch 68 to detect a fully-closed condition of throttle valve 20; air-flow sensor 70, such as a Karman vortex meter incorporated in air cleaner 69 at the front end of air intake pipe 18 to detect the amount of air flowing to combustion chamber 17 of engine 11; water temperature sensor 71 mounted to engine 11 to detect the cooling water temperature of engine 11; exhaust temperature sensor 74 mounted halfway through exhaust pipe 72 to detect the temperature of exhaust gas flowing in exhaust passage 73; and ignition key switch 75.

Output signals from crank angle sensor 62, front wheel rotation sensor 66, throttle opening sensor 67, idle switch 68, air flow sensor 70, water temperature sensor 71, exhaust temperature sensor 74, and ignition key switch 75 are individually transmitted to ECU 15.

TCL 76 for calculating target driving torque of engine 11, is connected to throttle opening sensor 67; accelerator opening sensor 77 mounted to throttle body 21 with throttle opening sensor 67 and idle switch 68; rear wheel rotation sensors 80 and 81 for individually detecting the rotation speeds of a pair of rear wheels 78 and 79 which are driven wheels; steering angle sensor 84 for detecting turning angle of steering shaft 83 during turning with respect to straightforward condition of vehicle 82; and steering shaft reference position sensor 86 for detecting normal phase (including a phase for nearly straightforward running of vehicle 82) at every 360 degrees of steering wheel 85, which is integral with steering shaft 83. Further, output signals from these sensors 77, 80, 81, 84, and 86 are individually transmitted to TCL 76.

ECU 15 and TCL 76 are connected through communication cable 87. ECU 15 transmits operation condition information of engine 11 such as engine rotation speed, rotation speed of output shaft 63 of hydraulic automatic transmission apparatus 13, and detection signal from idle switch 68, to TCL 76. Furthermore, TCL 76 transmits the target driving torque and the regard angle ratio of ignition timing calculated by TCL 76, to ECU 15.

In this embodiment, when slip amounts in the longitudinal direction of front wheels 64 and 65, which are driving wheels, are greater than predetermined values, the driving torque of engine 11 is reduced to ensure the operability. Further, a target driving torque of engine 11, when slip control to prevent energy loss is performed, and a target driving torque of engine 11, when turning control is performed, are individually calculated by TCL 76. An optimum final target driving torque is then selected from these two target driving torques, to reduce the driving torque of engine 11 as needed. Also, by a full-closing operation of throttle valve 20 through actuator 41, the target retard angle of ignition timing is set, taking into consideration a case when output reduction of engine 11 is not fast enough, to rapidly reduce the driving torque of engine 11.

Figure 4:
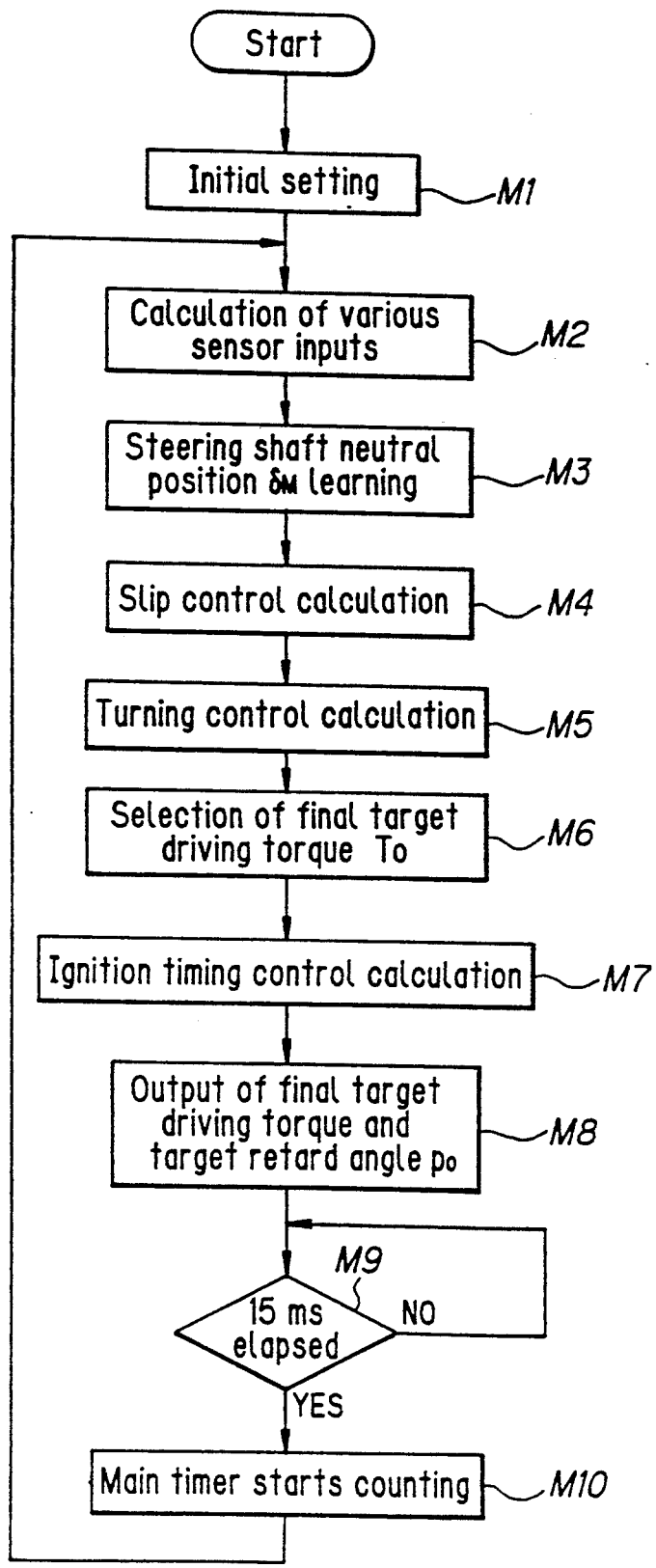
FIG. 4 is a flow chart showing the entire flow of control.

As shown in FIG. 4 showing a rough control flow in this embodiment, target driving torque $T_{OS}$, when slip control is performed, and target driving torque $T_{OC}$ of engine 11, when turning control is performed, are always calculated in parallel by TCL 76. Further, optimum final target driving torque $T_O$ is selected from two target driving torques $T_{OS}$ and $T_{OC}$ to reduce the driving torque of engine 11 as needed.

Specifically, the control program of this embodiment is started by turning on ignition key switch 75, and initially setting such things as the reading of initial value $\delta_{m(o)}$ of steering shaft turning position, resetting of various flags, and starting the counting of a main timer of every 15 milliseconds, which is a sampling period of this control, performed in step M1.

In M2, TCL 76 calculates vehicle speed V and the like according to detection signals from various sensors, and then learning corrects neutral position $\delta_M$ of steering shaft 83 in step M3. Since neutral position $\delta_M$ of steering shaft 83 of vehicle 82 is not stored in a memory (not shown) in ECU 15 or TCL 76, initial value $\delta_{m(o)}$ is read every time ignition key switch 75 is turned on. Further, it is learning corrected only when vehicle 82 satisfies a straightforward operating condition (described later). Further, initial value $\delta_{m(o)}$ is learning corrected until ignition key switch 75 is turned off.

Then, in step M4, TCL 76 calculates target driving torque $T_{OS}$ when slip control is performed to regulate the driving torque of engine 11 according to a detection signal from front wheel rotation sensor 66 and detection signals from rear wheel rotation sensors 80 and 81. In M5, TCL 76 calculates target driving torque $T_{OC}$ of engine 11 when turning control is performed, to regulate the driving torque of engine 11 according to detection signals from rear wheel rotation sensors 80 and 81 and a detection signal from steering angle position sensor 84.

Then, in step M6, TCL 76 selects optimum final target driving torque $T_O$ from target driving torques $T_{OS}$ and $T_{OC}$ by a method which will be described later, mainly in consideration of safety. Furthermore, when the vehicle starts abruptly or the road condition suddenly changes from a dry state to a frozen state, since output reduction of engine 11 may not occur fast enough when fully closing throttle valve 20 through actuator 41, in step M7, a retard angle ratio to correct reference retard angle $p_B$ is selected according to change rates $G_S$ of slip amounts of front wheels 64 and 65. Finally, data on final target driving torque $T_O$ and the retard angle ratio of reference retard angle $p_S$, is outputted to ECU 15 in step M8.

When the driver prefers slip control or turning control by operating a manual switch (not shown), ECU 15 controls duty ratios of the pair of torque control electromagnetic valves 51 and 56 so that the driving torque of engine 11 is final target driving torque $T_O$; calculates target retard angle $p_O$ according to data on retard angle ratio of reference retard angle $p_S$; and retards ignition timing P by target retard angle $p_O$ as needed, thereby achieving stable and safe running of vehicle 82.

When the driver does not prefer slip control or turning control and operates a manual switch (not shown), ECU 15 sets the duty ratios of the pair of torque control electromagnetic valves 51 and 56 to 0% side. Also, vehicle 82 is set to an ordinary driving condition according to the amount of pressure applied to the accelerator pedal 31 by the driver.

Thus, in step M9, the driving torque of engine 11 is controlled until counting down of every 15 seconds, that is, until the sampling period of the main timer is completed. Afterwards, steps from M2 to M10 are repeated until ignition key switch 75 is turned off.

When, in step M5, turning control is performed to calculate target driving torque of the engine, TCL 76 calculates vehicle speed V according to detection signals from the pair of rear wheel rotation sensors 80 and 81 by the following equation (1); calculates steering angle $\delta$ of front wheels 64 and 65 according to a detection signal from steering angle sensor 84 by the following equation (2); and determines target lateral acceleration $G_{YO}$ of vehicle 82 by the following equation (3):

$$V = \frac{V_{RL} + V_{RR}}{2} \quad (1)$$

$$\delta = \frac{\delta_H}{\rho_H} \quad (2)$$

$$G_{YO} = \frac{\delta}{l \cdot \left(A + \frac{1}{V^2}\right)} \quad (3)$$

wherein, $V_{RL}$ and $V_{RR}$ are individual peripheral speeds of the pair of rear wheels 78 and 79, $\rho_H$ is a steering gear ratio, l is a wheel base of vehicle 82, and A is a stability factor of the vehicle, which will be described later.

As can be seen from the equation (3), if the neutral position of steering shaft 83 varies due to toe-in adjustment of front wheels 64 and 65 during the setting up of vehicle 82 or the abrasion of a steering gear (not shown) over time, for example, a difference may occur between turning position $\delta_m$ of steering shaft 83 and the actual steering angle $\delta$ of the front wheels 64 and 65, which are steering wheels. As a result, exact calculation of target lateral acceleration $G_{YO}$ of vehicle 82 may become impossible, thereby making it difficult to satisfactorily perform turning control. Furthermore, since, in the present invention, during slip control in step M4, the reference driving torque of engine 11 is corrected according to turning angle $\delta_H$ of steering shaft 83, slip control may also become difficult. Therefore, it is necessary to learning correct neutral position $\delta_M$ in step M3.

Figure 5:
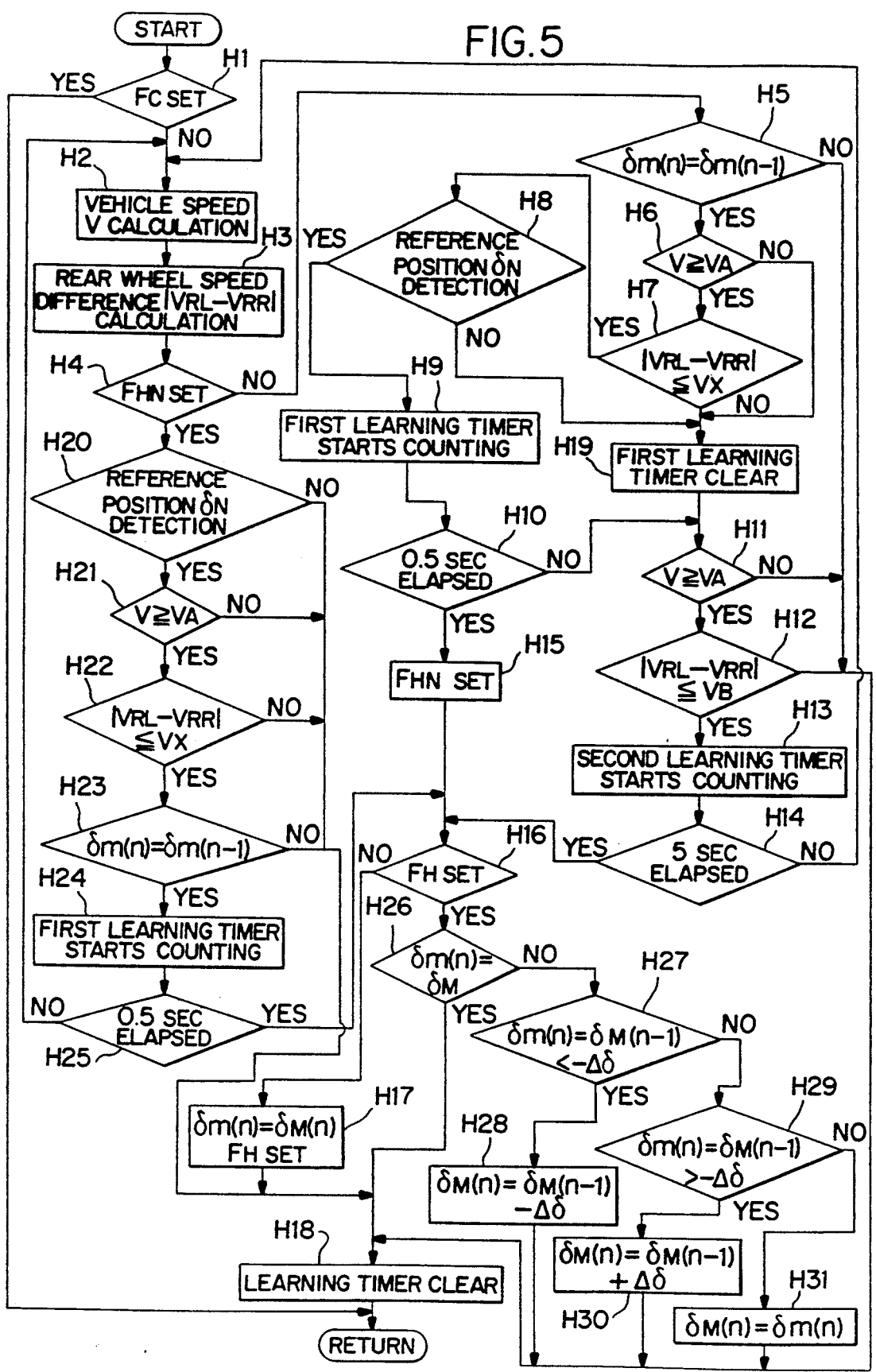
FIG. 5 is a flow chart showing the flow of neutral position learning correction of a steering shaft.
Figure 6:
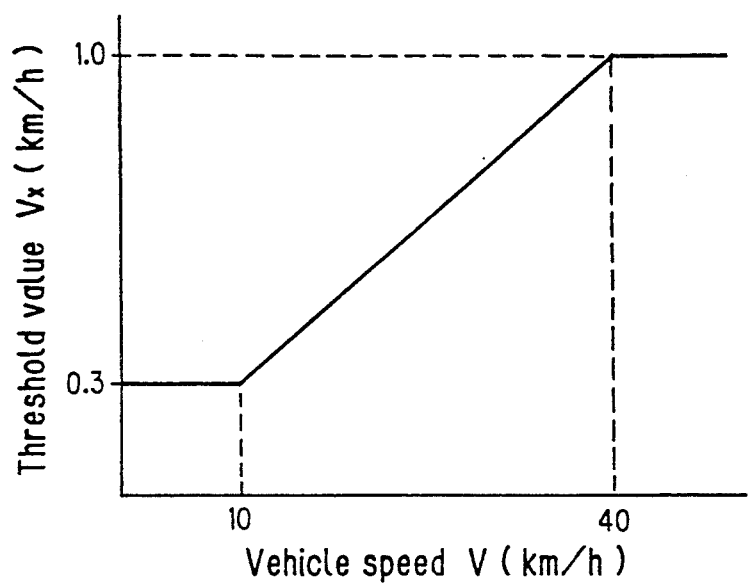
FIG. 6 is a graph showing the relationship between the vehicle speed and a variable threshold value.
Figure 7:
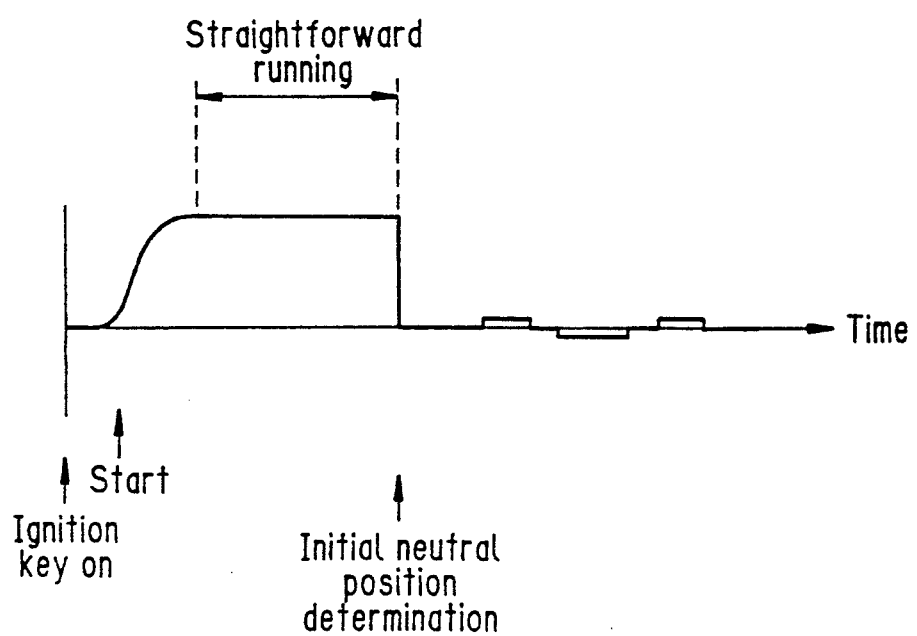
FIG. 7 is a graph showing an example of correction value when the steering shaft neutral position is learning corrected.

Referring to FIG. 5 showing the procedure of learning and correction of neutral position $\delta_M$ of steering shaft 83, TCL 76 determines, in step H1, whether or not turning control flag $F_C$ is set. When vehicle 82 is determined to be performing turning control in step H1, since output of engine 11 may abruptly change due to learning and correction of neutral position $\delta_M$ of steering shaft 83, which may deteriorate a drive feeling, learning and correction of neutral position $\delta_M$ of steering shaft 83 is not performed.

On the other hand, when, in step H1, vehicle 82 is determined not to be performing turning control, since no deterioration occurs even with learning correction of neutral position $\delta_M$ of steering shaft 83, in step H2, TCL 76 learns neutral position $\delta_M$ and calculates vehicle speed V for turning control which will be described later, according to detection signals from rear wheel rotation sensors 80 and 81 by equation (1) above. Then, TCL 76, in step H3, calculates rear wheel speed difference $|V_{RL} - V_{RR}|$. It then determines, in step H4, whether or not neutral position $\delta_M$ is learning corrected with reference position $\delta_N$ of steering shaft 83 detected by steering shaft reference position sensor 86. That is, it determines whether or not steering angle neutral position learned flag $F_{HN}$, with reference position $\delta_N$ of steering shaft 83 detected, is set.

Immediately after ignition key switch 75 is turned on, since steering angle neutral position learned flag $F_{HN}$ is not set, that is, learning of neutral position $\delta_M$ is that of the first time, it is determined in step H5 whether or not the presently calculated steering shaft turning position $\delta_{m(n)}$ is equal to the previously calculated steering shaft turning position $\delta_{m(n-1)}$. In this case, it is preferable that the turning detection resolution of steering angle sensor 84 is set to be approximately 5 degrees, so as to minimize effects of driver manipulation error or the like.

When, in step H5, it is determined that the presently calculated steering shaft turning position $\delta_{m(n)}$ is equal to the previously calculated steering shaft turning position $\delta_{m(n-1)}$, a determination is made, in step H6, as to whether or not vehicle speed V is greater than a predetermined threshold value $V_A$. This operation is necessary because rear wheel speed difference $|V_{RL}-V_{RR}|$ and the like cannot be detected unless vehicle 82 runs at a high speed, and threshold value $V_A$ is set adequately, for example, to 10 km per hour, through experiments on the operating characteristics of vehicle 82.

When, in step H6, it is determined that vehicle speed V is greater than threshold value $V_A$, TCL 76 determines in step H7, whether or not rear wheel speed difference $|V_{RL}-V_{RR}|$ is smaller than a predetermined threshold value $V_X$, for example, 0.3 km per hour. That is, it determines whether or not vehicle 82 is operating so as to be running straightforward. The reason why threshold value $V_X$ is not set to 0 km per hour is that, when tire air pressures of the rear wheels 78 and 79 are not equal to each other, peripheral speeds $V_{RL}$ and $V_{RR}$ of the right and left rear wheels 78 and 79 differ and vehicle 82 is determined as to be not running straightforward, despite the straightforward running of vehicle 82.

Figure 32:
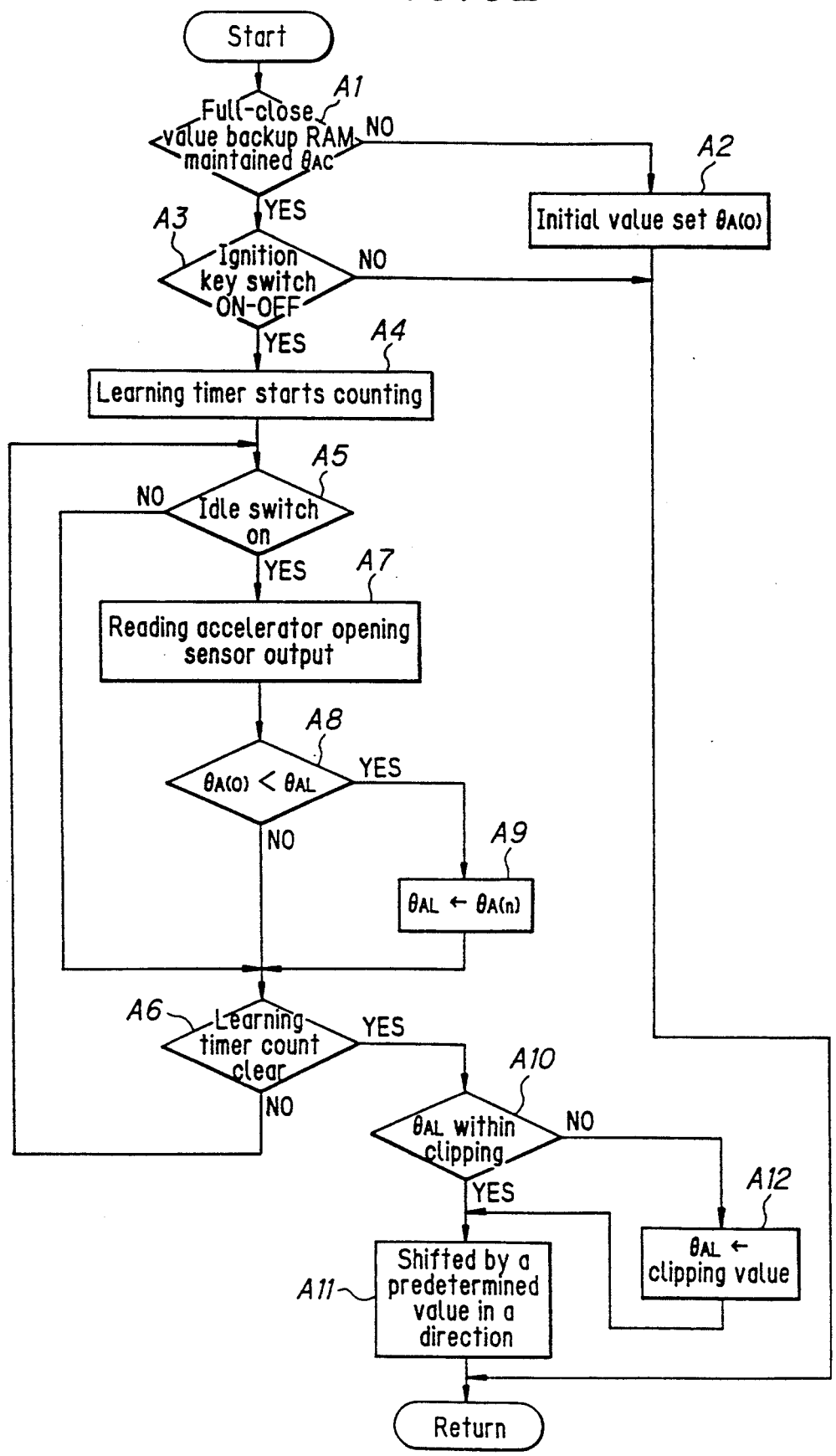
FIG. 32 is a flow chart showing another example of a learning correction procedure of a fully closed position of an accelerator opening sensor.

When tire air pressures of the right and left rear wheels 78 and 79 are not equal to each other, since rear wheel speed difference $|V_{RL}-V_{RR}|$ tends to increase in proportion to vehicle speed V, threshold value $V_X$ may be graphed, for example, as shown in FIG. 32 and threshold value $V_X$ be read from the graph according to vehicle speed V.

When it is determined in step H7 that rear wheel speed difference $|V_{RL}-V_{RR}|$ is smaller than threshold value $V_X$, a determination is made in step H8 as to whether or not steering shaft reference position sensor 86 detects reference position $\delta_N$ of steering shaft 83. When, in step H8, it is determined that steering shaft reference position sensor 86 detects reference position $\delta_N$ of steering shaft 83, that is, vehicle 82 is determined as running straightforward, counting of a first learning timer (not shown), built within TCL 76, is started in step H9.

Then TCL 76 determines, in step H10, whether or not 0.5 seconds has elapsed from the starting of the counting of the first learning timer, that is, whether or not the straightforward running of the vehicle 82 has continued for 0.5 seconds. Before 0.5 seconds has elapsed from the starting of counting of the first learning timer, a determination is made in step H11 as to whether or not vehicle speed V is greater than threshold value $V_A$. When it is determined in step H11 that vehicle speed V is greater than threshold value $V_A$, a determination is made in step H12 as to whether or not rear wheel speed difference $|V_{RL}-V_{RR}|$ is smaller than a threshold value $V_B$, such as 0.1 km per hour. When, in step H12, it is determined that rear wheel speed difference $|V_{RL}-V_{RR}|$ is smaller than threshold value $V_B$, that is, when vehicle 82 is determined to be running straightforward, counting of a second learning timer (not shown), built into TCL 76, is started in step H13.

Then, in step H14, a determination is made as to whether or not 5 seconds has elapsed from the starting of counting of the second learning timer, that is, whether or not the straightforward running of vehicle 82 has continued for 5 seconds. When 5 seconds has not elapsed from the starting of counting of the second learning timer, the procedure reverts back to step H2 and procedures from step H2 to step H14 are repeated.

In step H8, halfway through the repetition, when it is determined that steering shaft reference position sensor 86 detects reference position $\delta_N$ of steering shaft 83, the first learning timer starts counting in step H9. When it is determined in step H10 that 0.5 seconds has elapsed from the starting of counting of the first learning timer, that is, the straightforward running of vehicle 82 has continued for 0.5 seconds, steering angle neutral position learned flag $F_{HN}$ is set in step H15 with reference position $\delta_N$ of steering shaft 83 detected. Subsequently, in step H16, a determination is made as to whether or not steering angle neutral position learned flag $F_H$ is set with reference position $\delta_N$ of steering shaft 83 not detected. Also, when it is determined in step H14 that 5 seconds has elapsed from the starting of counting of the second learning timer, processing proceeds to step H16.

Since, in the above procedures, steering angle neutral position learned flag $F_H$ is not set in the state where reference position $\delta_N$ is not detected, in step H16, it is determined that steering angle neutral position learned flag $F_H$ is not set in the state where reference position $\delta_N$ is not detected. Thus, learning of neutral position $\delta_M$ is, for the first time, in the state where reference position $\delta_N$ of steering shaft 83 is not detected. In step H17, present steering shaft turning position $\delta_{m(n)}$ is regarded as neutral position $\delta_{M(n)}$ of steering shaft 83, which is stored in a memory in TCL 76. Further, steering angle neutral position learned flag $F_H$, in the state where reference position $\delta_N$ of steering shaft 83 is not detected, is set.

After neutral position $\delta_{M(n)}$ of steering shaft 83 is set, turning angle $\delta_H$ of steering shaft 83 is calculated with respect to neutral position $\delta_M$ of steering shaft 83. The count of learning timer is then cleared in step H18. Finally, steering angle neutral position learning is again performed.

When it is determined, in step H5, that presently calculated steering shaft turning position $\delta_{m(n)}$ is not equal to previously calculated steering shaft turning position $\delta_{m(n-1)}$; or, when it is determined in step H11 that vehicle speed V is not above threshold value $V_A$, that is, rear wheel speed difference $|V_{RL}-V_{RR}|$ calculated in step H12 is not reliable; or, when it is determined in step H12 that rear wheel speed difference $|V_{RL}-V_{RR}|$ is greater than threshold value $V_B$, it is determined that vehicle 82 is not running straightforward, and processing proceeds to step H18.

When it is determined in step H7 that rear wheel speed difference $|V_{RL}-V_{RR}|$ is greater than threshold value $V_X$; or, when it is determined in step H8 that steering shaft reference position sensor 86 does not detect reference position $\delta_N$ of steering shaft 83, the count of the first learning timer is cleared in step H19. Processing then proceeds to step H11. Further, when it is determined in step H6 that vehicle speed V is smaller than threshold value $V_A$, since the vehicle 82 cannot be determined to be running straightforward, processing also proceeds to step H11.

On the other hand, when it is determined in step H4 that steering angle neutral position learned flag $F_{HN}$ is set with reference position $\delta_N$ of steering shaft 83 detected, that is, the learning of neutral position $\delta_H$ is that of at least the second time, a determination is made in step H20 as to whether or not steering shaft reference position sensor 86 detects reference position $\delta_N$ of steering shaft 83. When it is determined in step H20 that steering shaft position sensor 86 detects reference position $\delta_N$ of steering shaft 83, a determination is made in step H21 as to whether or not vehicle speed V is greater than a predetermined threshold value $V_A$.

When it is determined in step H21 that vehicle speed V is greater than threshold value $V_A$, TCL 76 determines in step H22 whether or not rear wheel speed difference $|V_{RL}-V_{RR}|$ is smaller than threshold value $V_X$, that is, whether or not vehicle 82 is running straightforward. When it is determined in step H22 that rear wheel speed difference $|V_{RL}-V_{RR}|$ is smaller than threshold value $V_X$, a determination is made in step H23 as to whether or not presently calculated steering shaft turning position $\delta_{m(n)}$ is equal to previously calculated steering shaft turning position $\delta_{m(n-1)}$. When it is determined in step H23 that the presently calculated steering shaft turning position $\delta_{m(n)}$ is equal to the previously calculated steering shaft turning position $\delta_{m(n-1)}$, the first learning timer begins counting in step H24.

Then, TCL 76, in step H25, determines whether or not 0.5 seconds has elapsed from the beginning of counting of the first learning timer, that is, whether or not the straightforward running of the vehicle 82 has continued for 0.5 seconds. Before 0.5 seconds has elapsed from the starting of counting of the first learning timer, the procedure reverts back to step H2, and steps H2 to H4, and steps H20 to H25 are repeated. To the contrary, when 0.5 seconds has elapsed from the starting of the counting of the first learning timer, the procedure proceeds to step H16.

When it is determined in step H20 that steering shaft reference position sensor 86 does not detect reference position $\delta_N$ of steering shaft 83; or, when it is determined in step H21 that vehicle speed V is not greater than threshold value $V_A$, that is, rear wheel speed difference $|V_{RL}-V_{RR}|$ calculated in step H22 is not reliable; or, when it is determined in step H22 that rear wheel speed difference $|V_{RL}-V_{RR}|$ is greater than threshold value $V_X$; or, when, in step H23 it is determined that presently calculated steering shaft turning position $\delta_{m(n)}$ is not equal to previously calculated steering shaft turning position $\delta_{m(n-1)}$, the procedure proceeds to step H18.

When, in step H16, it is determined that steering angle neutral position learned flag $F_H$ is set, that is, learning of neutral position $\delta_M$ is that of at least the second time, TCL 76 determines in step H26 whether or not the present steering shaft turning position $\delta_{m(n)}$ is equal to previous neutral position $\delta_{M(n-1)}$ of steering shaft 83. In other words, it is determined whether or not $$\delta_{m(n)}=\delta_{M(n-1)}.$$

When it is determined that the present steering shaft turning position $\delta_{m(n)}$ is equal to the previous neutral position $\delta_{M(n-1)}$ of steering shaft 83, the procedure proceeds to step H18 where the next steering angle neutral position is learned.

When, in step H26, it is determined that the present steering shaft turning position $\delta_{m(n)}$ is not equal to the previous neutral position $\delta_{M(n-1)}$ of steering shaft 83 due to play or the like in the steering system, in this embodiment, present steering shaft turning position $\delta_{m(n)}$ is not regarded as the neutral position $\delta_{M(n)}$ of steering shaft 83. However, when the absolute value of a difference between these values is greater than a predetermined correction limit $\Delta\delta$, the correction limit $\Delta\delta$ is substracted from, or added to, the previous steering shaft turning position $\delta_{m(n-1)}$ to obtain a new neutral position $\delta_{M(n)}$ of steering shaft 83, which is stored in a memory in TCL 76.

TCL 76 determines, in step H27, whether or not steering shaft turning position $\delta_{m(n)}$, substracted by neutral position $\delta_{M(n-1)}$, is smaller than a predetermined negative correction limit $-\Delta\delta$. When, in step H27, it is determined that the substracted value is smaller than the negative correction limit $-\Delta\delta$, in step H28, the new neutral position $\delta_{M(n)}$ of steering shaft 83 is changed to $$\delta_{M(n)}=\delta_{M(n-1)}-\Delta\delta,$$

from the previous neutral position $\delta_{M(n-1)}$ of steering shaft 83 and the negative correction limit $\Delta\delta$, to prevent the learning and correction amount, at one time, from unconditionally becoming a large negative value.

With this arrangement, even when an abnormal signal is outputted from steering angle sensor 84 for some reason, the neutral position $\delta_M$ does not change rapidly. Thus, measures to correct this abnormality can be taken immediately.

On the other hand, when, in step H27, it is determined that the substracted value is greater than the negative correction limit $-\Delta\delta$, a determination is made in step H29 as to whether or not the present steering shaft turning position $\delta_{m(n)}$ subtracted by the neutral position $\delta_{M(n-1)}$ of steering shaft 83 is greater than positive correction limit $\Delta\delta$. When, in step H29, it is determined that the subtracted value is greater than the positive correction limit $\Delta\delta$, in step H30, a new neutral position $\delta_{M(n)}$ of steering shaft 83 is changed to $$\delta_{M(n)}=\delta_{M(n-1)}+\Delta\delta,$$

from the previous neutral position $\delta_{M(n-1)}$ of steering shaft 83 and positive correction limit $\Delta\delta$, to prevent the learning and correction amount, at one time, from unconditionally becoming a large positive value.

With this arrangement, even when an abnormal signal is outputted from steering angle sensor 84 for some reason, the neutral position $\delta_M$ does not change rapidly, and measures to correct this abnormality can be taken immediately.

However, when it is determined in step H29 that the subtracted value is smaller than the positive correction limit $\Delta\delta$, in step H31, the present steering shaft turning position $\delta_{m(n)}$ is read, as is, as the neutral position $\delta_{M(n)}$ of steering shaft 83.

As described above, in this embodiment, when learning and correcting the neutral position $\delta_M$ of steering shaft 83, in addition to the use of only rear wheel speed difference $|V_{RL}-V_{RR}|$, a detection signal from steering shaft reference position sensor 86 can also be used to learning correct the neutral position $\delta_M$ of steering shaft 83, a relatively short time after starting vehicle 82. Further, even when steering shaft reference position sensor 86 malfunctions for some reason, the neutral position $\delta_M$ of steering shaft 83 can be learning corrected with only rear wheel speed difference $|V_{RL}-V_{RR}|$, thus providing improved safety.

When standstill vehicle 82 starts with front wheels 64 and 65 beginning a turning state, as shown in FIG. 2 showing an example of changes in the neutral position $\delta_M$ of steering shaft 83, the correction amount in step M1 of the steering shaft turning position from the initial value $\delta_{m(0)}$ is very large when the learning correction of neutral position $\delta_M$ is determined for the first time, but the neutral position $\delta_M$ of steering shaft 83 determined for the second time and subsequent time, is suppressed due to operation in steps H17 and H19.

After the neutral position $\delta_M$ of steering shaft 83 is learning corrected, target driving torque $T_{OS}$ for slip control to regulate driving torque of engine 11 is calculated according to detection signals from front wheel rotation sensor 66 and rear wheel rotation sensors 80 and 81.

Since a friction coefficient between the tire and the road surface can be regarded as equivalent to the rate of change in vehicle speed V (hereinafter referred to as longitudinal direction acceleration $G_X$) applied to vehicle 82, in this embodiment, longitudinal direction acceleration $G_X$ is calculated according to detection signals from rear wheel rotation sensors 80 and 81. Further, reference driving torque $T_B$ of engine 11 corresponding to a maximum value of longitudinal direction acceleration $G_X$ is corrected according to a difference between front wheel speed $V_F$ detected by front wheel rotation sensor 66 and target front wheel speed $V_O$ corresponding to vehicle speed V (hereinafter referred to as slip amount), to calculate target driving torque $T_{OS}$.

Figure 8:
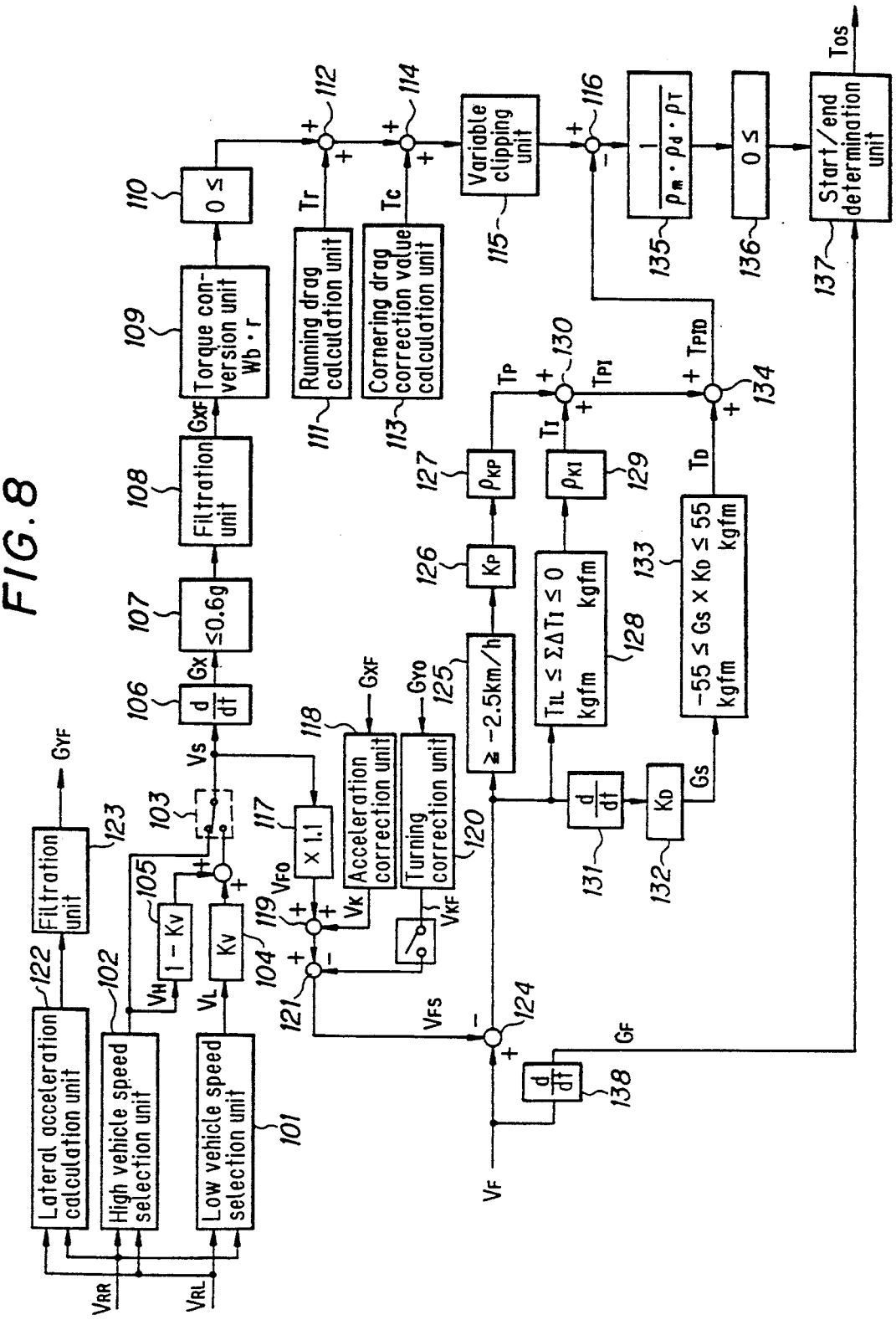
FIG. 8 is a block diagram showing a target torque calculation procedure for slip control.

Referring to FIG. 8, illustrating a calculation block diagram to calculate target driving torque $T_{OS}$ of engine 11, TCL 76 first calculates vehicle speed $V_S$ for slip control according to detection signals from rear wheel rotation sensors 80 and 81. Specifically, in this embodiment, the smaller value of the two rear wheel speeds $V_{RL}$ and $V_{RR}$ is selected as a first vehicle speed $V_S$ by low vehicle speed selection unit 101. The greater value of the two rear wheel speeds $V_{RL}$ and $V_{RR}$ is selected as a second vehicle speed $V_S$ by high vehicle speed selection unit 102. Further, the output of one of the two selection units 101 and 102 is further selected by select switch 103.

In this embodiment, first vehicle speed $V_S$ selected by low vehicle speed selection unit 101 is obtained by multiplying the smaller value $V_L$ of the two rear wheel speeds $V_{RL}$ and $V_{RR}$, in multiplication unit 104, by a weighting factor $K_V$ corresponding to vehicle speed V calculated by equation (1). A product of the greater value $V_H$ of the two rear wheel speeds $V_{RL}$ and $V_{RR}$ multiplied, in multiplication unit 105, by $(1-K_V)$, is then added.

Thus, when the driving torque of engine 11 is actually reduced by slip control, that is, when slip control flag $F_S$ is set, whichever value of the two rear wheel speeds $V_{RL}$ and $V_{RR}$ is smaller, is selected as vehicle speed $V_S$ by select switch 103. Further, when the driving torque of engine 11 is not reduced, that is, when slip control flag $F_S$ is reset, whichever value of the two rear wheel speeds $V_{RL}$ and $V_{RR}$ is greater, is selected as vehicle speed $V_S$, even if the driver desires slip control.

This is to make it difficult for the driving torque of engine 11 to move from an unreduced state to a reduced state, and, at the same time, also to make the reverse movement difficult. For example, this is to prevent such a case wherein, when the smaller value of the two rear wheel speeds $V_{RL}$ and $V_{RR}$, occuring during turning of vehicle 82, is selected as vehicle speed $V_S$, it may be determined as an occurrence of a slip even no slip occurs in front wheels 64 and 65. Thus, the driving torque of engine 11 is reduced. Further, once the driving torque of engine 11 is reduced, this state is continued in view of operating safety of vehicle 82.

When vehicle speed $V_S$ is calulated in low vehicle speed selection unit 101, the reason why the smaller value $V_L$, of the two rear wheel speeds $V_{RL}$ and $V_{RR}$, is multiplied in multiplication unit 104 by weighting factor $K_V$ and added with the greater value $V_H$ of the two rear wheel speeds $V_{RL}$ and $V_{RR}$, multiplied in multiplication unit 105 by $(1-K_V)$, to calculate vehicle speed $V_S$ is that, when, for example, operating on a small curvature road such as that which occurs when turning to the right or left at a crossroad, an average value of the peripheral speeds of front wheels 64 and 65 largely differs from the smaller value $V_L$ of the two rear wheel speeds $V_{RL}$ and $V_{RR}$, and the driving torque correction by feedback tends to become too large, thereby deteriorating acceleration of vehicle 82.

Figure 9:
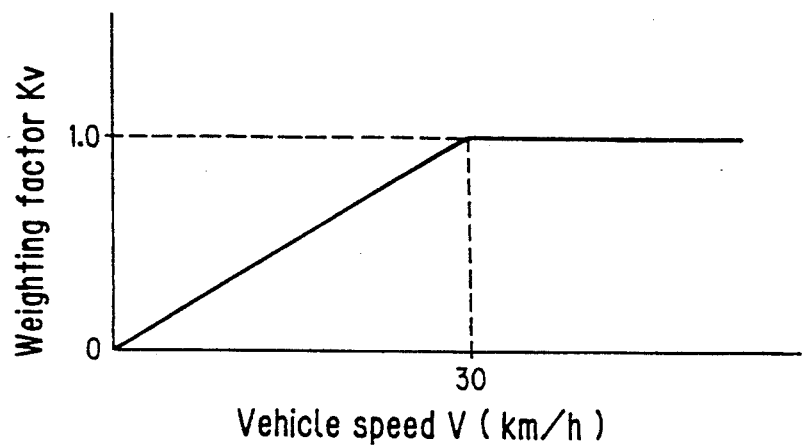
FIG. 9 is a graph showing the relationship between vehicle speed and correction factor.
Figure 10:
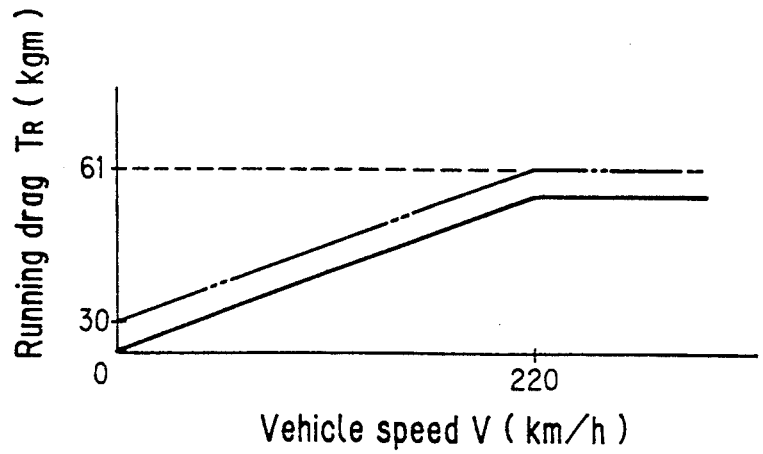
FIG. 10 is a graph showing the relationship between vehicle speed and running drag.

In this embodiment, weighting factor $K_V$ is read from a graph shown in FIG. 9 according to vehicle speed V of equation (1), which is an average value of the peripheral speeds of rear wheels 78 and 79, maintaining the acceleration performance of vehicle 82 even when operating on a curved road with a small curvature radius such as that which occurs when turning to the right or left at crossroads.

To calculate longitudinal direction acceleration $G_X$ according to the thus calculated vehicle speed $V_S$ for slip control, first, present running acceleration $G_{X(n)}$ of vehicle 82 is calculated in differentiation unit 106 from presently calculated vehicle speed $V_{S(n)}$ and previously calculated vehicle speed $V_{S(n-1)}$ by the following equation:

$$G_{X(n)} = \frac{V_{S(n)} - V_{S(n-1)}}{3.6 \cdot \Delta t \cdot g}.$$

wherein $\Delta t$ is a sampling period of this control, that is, 15 milliseconds, for example, and g is a gravitational acceleration.

When the calculated longitudinal direction acceleration $G_{X(n)}$ is more than 0.6 g, longitudinal direction acceleration $G_{X(n)}$ is clipped by clipping unit 107 so that a maximum value of longitudinal direction acceleration $G_{X(n)}$ does not exceed 0.6 g in view of safety reduction from miscalculation or the like. Furthermore, filtering occurs by filtration unit 108 to remove noise and allow calculation of corrected longitudinal direction acceleration $G_{XF}$.

This filtration is to correct longitudinal direction acceleration $G_{X(n)}$ so that slip rate S of the tires is maintained at target slip rate $S_O$, or at a smaller value within its vicinity, corresponding to a maximum value of a friction coefficient between the tire and road surface. This occurs even when a maximum value of longitudinal direction acceleration $G_{X(n)}$ of vehicle 82 varies and slip rate S of the tires tends to come out of target slip rate $S_O$, or of a smaller value within its vicinity, corresponding to the maximum value of a friction coefficient between the tire and road surface. This is because longitudinal direction acceleration $G_{X(n)}$ of vehicle 82 can be regarded as equivalent to the friction coefficient between the tire and road surface. This is performed as follows.

When present longitudinal direction acceleration $G_{X(n)}$ is greater than the filtered previously corrected longitudinal direction acceleration $G_{XF(n-1)}$, that is, when vehicle 82 continues increasing speed, the present corrected longitudinal direction acceleration $G_{XF(n)}$ is delayed as $$G_{XF(n)} = \frac{28}{256} \cdot \Sigma(G_{X(n)} - G_{XF(n-1)})$$

to remove noise, causing corrected longitudinal direction acceleration $G_{XF(n)}$ to follow longitudinal direction acceleration $G_{X(n)}$ relatively rapidly.

When the present longitudinal direction acceleration $G_{X(n)}$ is less than filtered previous corrected longitudinal direction acceleration $G_{XF(n-1)}$, that is, when vehicle 82 is not increasing in speed, the following treatment is made every sampling period $\Delta t$ of the main timer.

When slip control flag $F_S$ is not set, that is, when the driving torque of engine 11 is not reduced by slip control, vehicle 82 is decreasing speed, and reduction of corrected longitudinal direction acceleration $G_{XF(n)}$ is suppressed as $$G_{XF(n)} = G_{XF(n-1)} - 0.002.$$

This thereby ensures a response to the driver's demand to increase the speed of vehicle 82.

Also when the driving torque of engine 11 is reduced by slip control, and slip amount s is positive, that is, when a slip occurs in front wheels 64 and 65, since vehicle 82 is decreasing in speed and has no safety problem, reduction of corrected longitudinal direction acceleration $G_{XF}$ is suppressed as $$G_{XF(n)} = G_{XF(n-1)} - 0.002.$$

This thereby ensures a response to the driver's demand to increase the speed of vehicle 82.

Furthermore, when the driving torque of engine 11 is reduced by slip control and slip amount s of front wheels 64 and 65 is negative, that is, when vehicle 82 is decreasing in speed, the maximum value of corrected longitudinal direction acceleration $G_{XF}$ is maintained. This thereby ensures a response to the driver's demand to increase the speed of vehicle 82.

Similarly, when the driving torque of engine 11 is reduced by slip control, and when hydraulic automatic transmission 13 is shifted up by hydraulic control device 16, the maximum value of corrected longitudinal direction acceleration $G_{XF}$ is maintained to ensure a feeling of acceleration for the driver.

Corrected longitudinal direction acceleration $G_{XF}$ with noise reduced by filtration unit 108 is torque converted by torque conversion unit 109. The filtration may alternatively be made after torque conversion by torque conversion unit 109.

Since the value calculated by torque conversion unit 109 should be a positive value, the value is clipped to that above zero by clipping unit 110 to prevent miscalculation. Further, running drag $T_R$, calculated by running drag calculation unit 111, is added by addition unit 112. Further, cornering drag correction torque $T_C$, calculated by cornering drag correction value calculation unit 113 according to a detection signal from steering angle sensor 84, is added by addition unit 114, to calculate reference driving torque $T_B$ by equation (4):

$$T_B = G_{FO} \cdot W_b \cdot r + T_R + T_C \tag{4}$$

wherein $W_b$ is a vehicle body weight, and r is an effective radius of front wheels 64 and 65.

Figure 35:
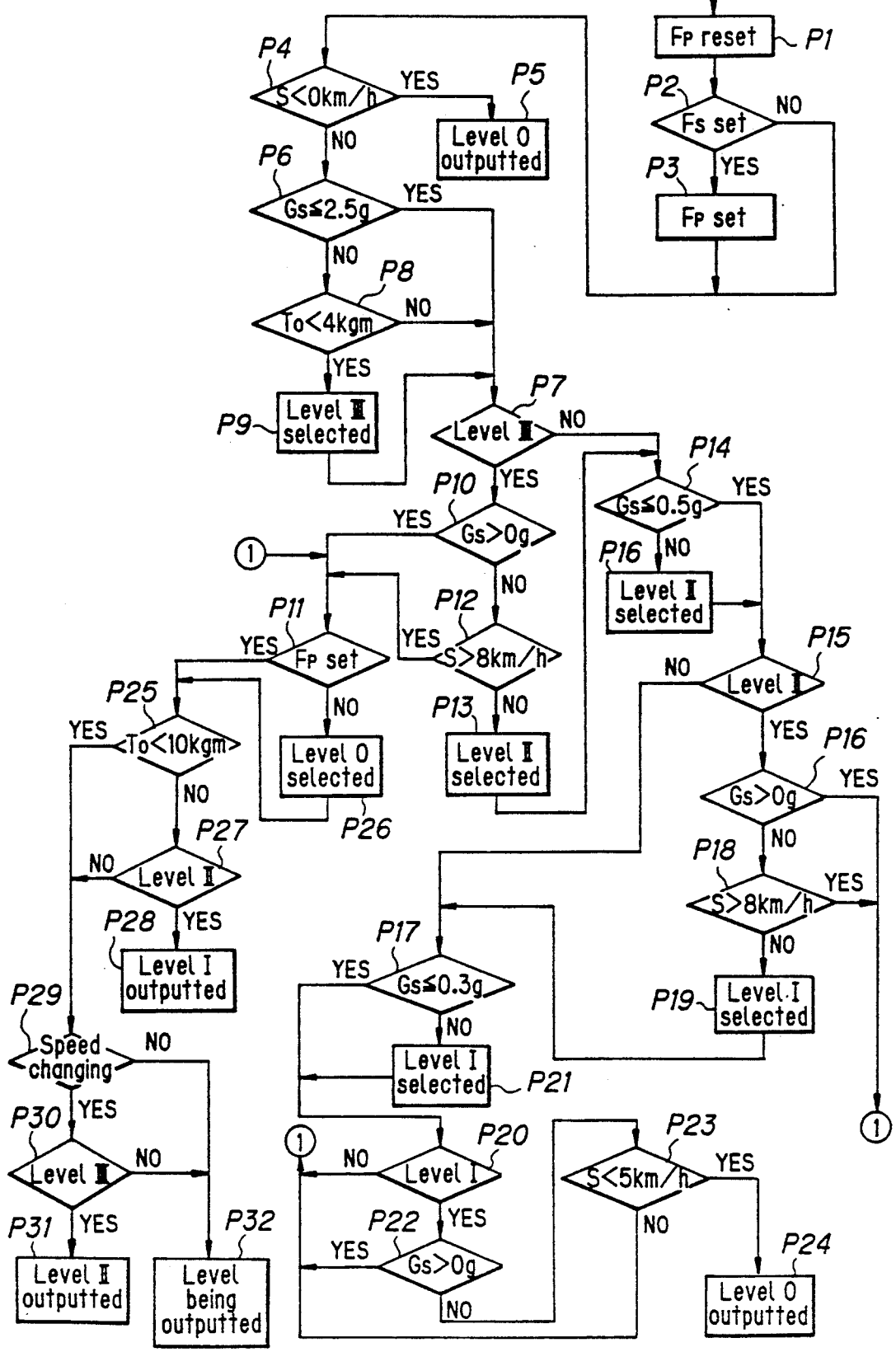
FIG. 35 is a flow chart showing retard angle ratio selection flow.

Running drag $T_R$ can be calculated as a function of vehicle speed V. However, in this embodiment, it is determined from a graph as shown in FIG. 35. In this case, since running drag $T_R$ differs between a level road and an ascending slope, the graph contains a solid line curve for a level road and a two-dot-bar curve for an ascending road. One of these is selected according to a detection signal from an inclination sensor (not shown) incorporated in vehicle 82. However, running drag $T_R$ can also be set in detail by including a descending slope and the like.

Figure 11:
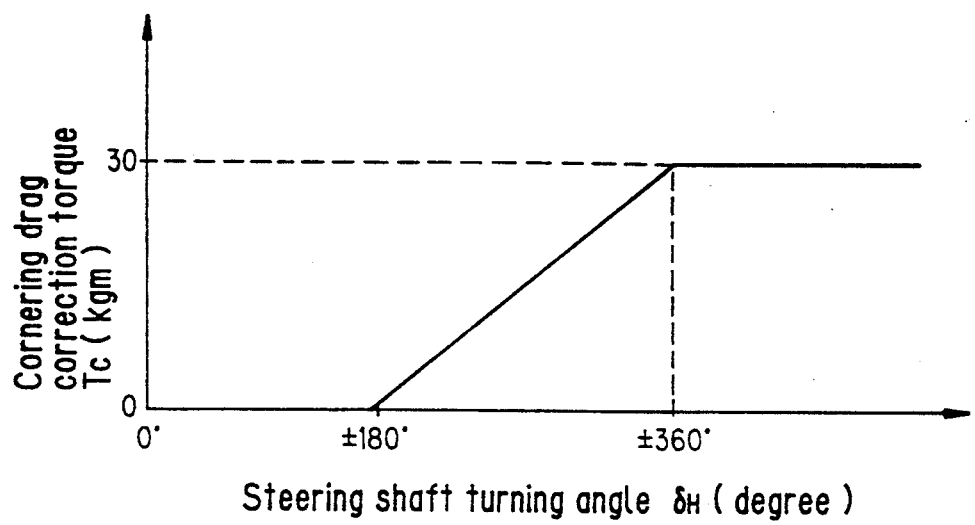
FIG. 11 is a graph showing the relationship between steering shaft turning amount and correction torque.

In this embodiment, cornering drag correction torque $T_C$ is determined from a graph as shown in FIG. 11, which can set reference driving torque $T_B$ of engine 11 approximate to the actual operating condition. Reference torque $T_B$ of engine 11, immediately after passing through a curve, is set slightly higher, thereby improving the feeling of acceleration of vehicle 82 after passing through a curved road.

Figure 12:
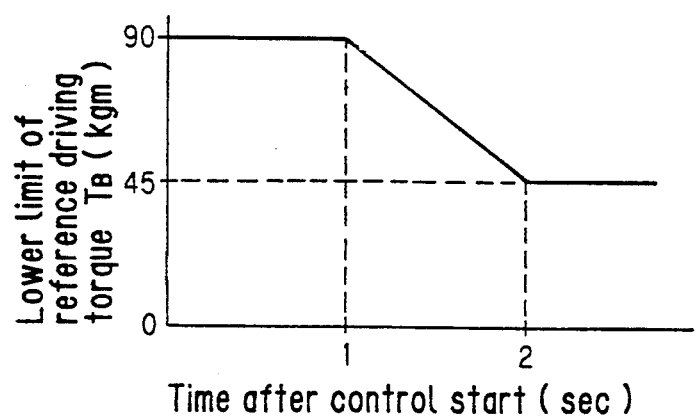
FIG. 12 is a graph for regulating the lower limit of target driving torque immediately after beginning slip control.

For reference driving torque $T_B$ calculated by equation (4), in this embodiment, a lower limit value is set by variable clipping unit 115 to prevent reference driving torque $T_B$, subtracted by final correction torque $T_{PID}$ (described later) by subtraction unit 116, from becoming a negative value. The lower limit value for reference driving torque $T_B$ is reduced, step by step over time, from the beginning of slip control, as shown in a graph in FIG. 12.

TCL 76 calculates actual front wheel speed $V_F$ according to a detection signal from front wheel rotation sensor 66. Further, as previously described, by feedback control of reference driving torque $T_{OS}$ using slip amount s, which is a difference between target front wheel speed $V_{FO}$ set according to front wheel speed $V_F$ and vehicle speed $V_S$ for slip control and target front wheel speed $V_{FS}$ for correction torque calculation, calculates target driving torque $T_{OS}$ of engine 11.

Figure 13:
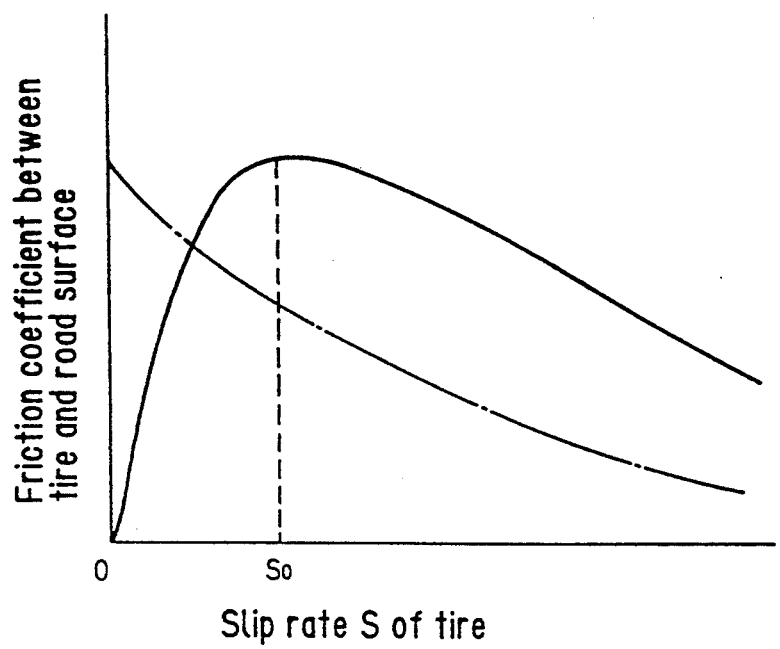
FIG. 13 is a graph showing the relationship between frictional coefficient of tires and the road surface and slip rate of the tires.
Figure 14:
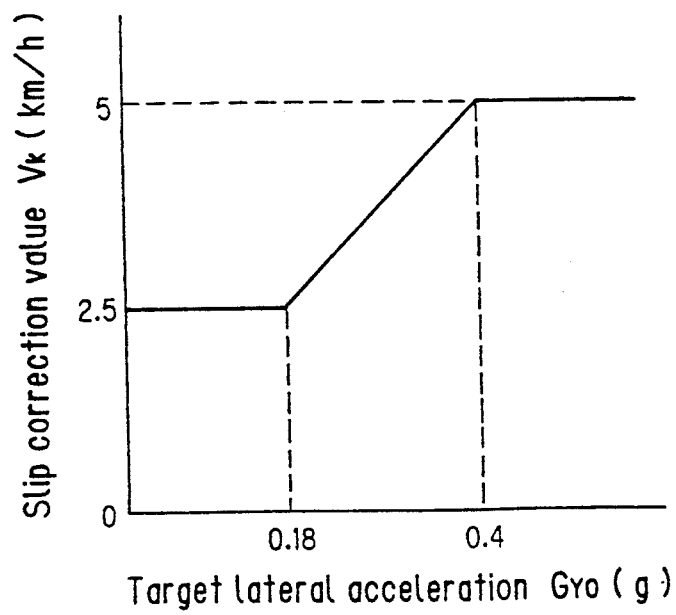
FIG. 14 is a graph showing the relationship between target lateral acceleration and the slip correction amount associated with acceleration.

To achieve effective utilization of the driving torque generated in engine 11 during acceleration of vehicle 82, as shown by solid lines in FIG. 13, it is preferable to adjust slip rate S of the tires of front wheels 64 and 65, during operation, to a smaller value, or a value within the vicinity of target slip rate $S_O$ corresponding to the friction coefficient between the tire and road surface. This prevents energy loss and prevents operability and acceleration performance from being deteriorated.

Since it is known that target slip rate $S_O$ fluctuates in the range from 0.1 to 0.25 depending on the road condition, it is preferable to generate a slip amount s of about 10% in front wheels 64 and 65, as driving wheels, to the road surface during operation of vehicle 82. In view of the above, target front wheel speed $V_{FO}$ is set by multiplication unit 117 as follows:

$$V_{FO} = 1.1 \cdot V.$$

TCL 76 reads slip correction amount $V_K$ corresponding to the previously described corrected longitudinal direction acceleration $G_{XF}$ from a graph as shown in FIG. 38 by acceleration correction unit 118, and adds it to a reference torque calculation target front wheel speed $V_{FO}$ in addition unit 119. Slip correction amount $V_K$ has a tendency to increase, step by step, as corrected longitudinal direction acceleration $G_{XF}$ increases. Further, in this embodiment, this graph is prepared through running experimental tests or the like.

As a result, correction torque calculation target front wheel speed $V_{FS}$ is increased, and slip rate S during acceleration is set to target slip rate $S_O$ shown by solid lines in FIG. 13 or to a smaller value within its vicinity.

On the other hand, referring to the dot-dash lines in FIG. 13 showing the relationship between the friction coefficient between the tire and road surface during turning and the slip rate S of the tire, it can be seen that slip rate S of the tire, which becomes the maximum value of the friction coefficient between the tire and road surface during turning, is far smaller than target slip rate $S_O$ of the tire, which becomes a maximum value of the friction coefficient between the tire and road surface during straightforward running. Therefore, during turning of vehicle 82, it is preferable to set target front wheel speed $V_{FO}$ to a value smaller value than that of straightforward running, so that vehicle 82 can make smooth turning.

Figure 15:
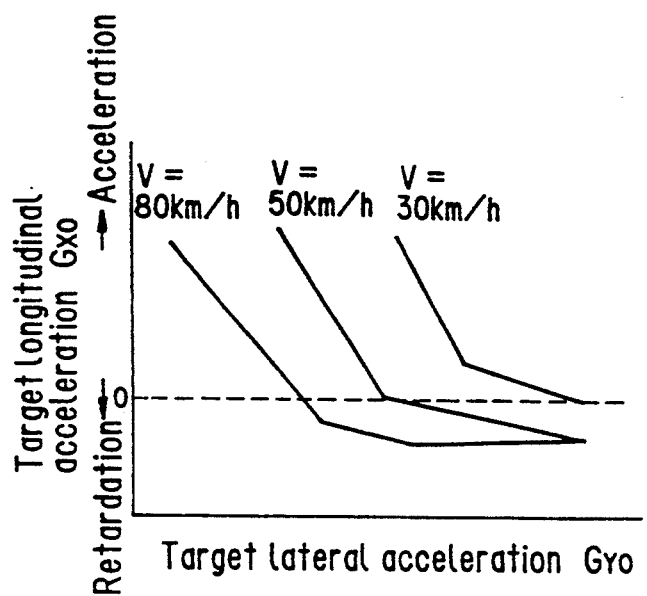
FIG. 15 is a graph showing the relationship between lateral acceleration and slip correction amount associated with turning.

Then, slip correction value $V_{KC}$ corresponding to target lateral acceleration $G_{YO}$ is read from a graph as shown by solid lines in FIG. 15 by turning correction unit 120, and the result is subtracted from reference torque calculation target front wheel speed $V_{FO}$ in subtraction unit 121. This is, provided, however, that before the first learning of neutral position $\delta_M$ of steering shaft 83 is made after ignition key switch 75 is turned on, turning angle $\delta_H$ of steering shaft 83 is not reliable. Thus, slip correction value $V_{KC}$ is read from a graph as shown by broken lines in FIG. 15 according to lateral acceleration $G_Y$ actually applied to vehicle 82 by peripheral speeds $V_{RL}$ and $V_{RR}$ or rear wheels 78 and 79.

Target lateral acceleration $G_{YO}$ is determined by calculating steering angle $\delta$ by equation (2) according to a detection signal from steering angle sensor 84 and calculating from steering angle $\delta$ by equation (3). Thereafter, neutral position $\delta_M$ is learning corrected.

Therefore, when an abnormality occurs in steering angle sensor 84 or steering shaft reference position sensor 86, target lateral acceleration $G_{YO}$ may become an incorrect value. Then, when an abnormality occurs in steering angle sensor 84 or the like, actual lateral acceleration $G_Y$ generated in vehicle 82 is calculated by using the rear wheel speed difference $|V_{RL}-V_{RR}|$, which is used in place of target lateral acceleration $G_{YO}$.

Specifically, actual lateral acceleration $G_Y$ is calculated from the rear wheel speed difference $|V_{RL}-V_{RR}|$ and vehicle speed V by lateral acceleration calculation unit 122, incorporated in TCL 76 using equation (5) below. It is then noise filtered by filtration unit 123 into a corrected lateral acceleration $G_{YF}$ which is used.

$$G_Y = \frac{|V_{RL} - V_{RR}| \cdot V}{3.6^2 \cdot b \cdot g}, \quad (5)$$

wherein b is the tread of rear wheels 78 and 79. In filtration unit 123, the present corrected lateral acceleration $G_{YF(n)}$ is low-pass filtered by the following digital calculation from the presently calculated lateral acceleration $G_{Y(n)}$ and the previously calculated corrected lateral acceleration $G_{YF(n-1)}$.

$$G_{YF(n)} = \Sigma \frac{20}{256} \{G_{Y(n)} - G_{YF(n-1)}\}$$

Figure 16:
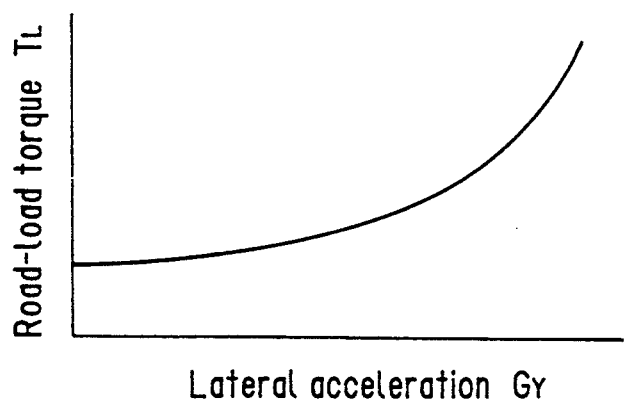
FIG. 16 is a circuit diagram for detecting abnormality of steering angle sensor 84.

Whether or not an abnormality occurs in steering angle sensor 84 or steering shaft reference position sensor 86, it can be detected by TCL 76, for example, using an open circuit detection circuit or the like as shown in FIG. 16. Specifically, the output of steering angle sensor 84 and steering shaft reference position sensor 86 is pulled up by resistor R and grounded by capacitor C. Subsequently, the output is inputted to terminal AO of TCL 76 for use in various controls, and also to terminal A1 through comparator 88. The negative terminal of comparator 88 is applied with a reference voltage of 4.5 V. When an open circuit occurs in steering angle sensor 84, input voltage to terminal A0 exceeds the reference value. The comparator is then turned on, and the input voltage to terminal A1 is continuously at a high level H. The program of TCL 76 is set so that when the input voltage to terminal A1 is at a high level H for a predetermined period of time, for example, 2 seconds, it is determined as an open circuit. This thereby detects an occurrence of an abnormality of steering angle sensor 84 or steering shaft reference position sensor 86.

In the above-described embodiment, an abnormality of steering angle sensor 84 or the like is detected by hardware. However, such an abnormality can naturally be detected by software.

Figure 17:
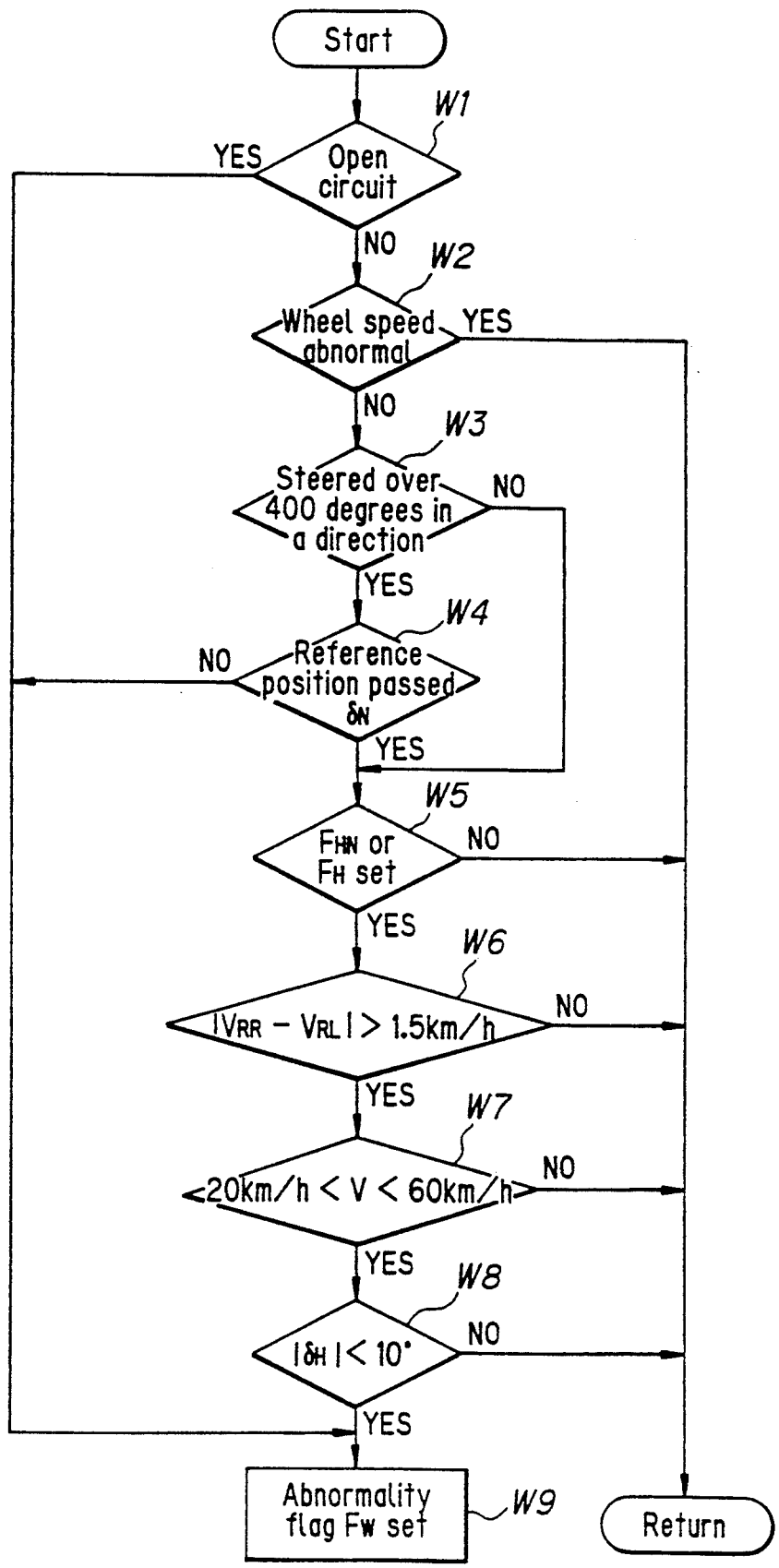
FIG. 17 is a flow chart showing abnormality detection flow of steering angle sensor.
Figure 18:
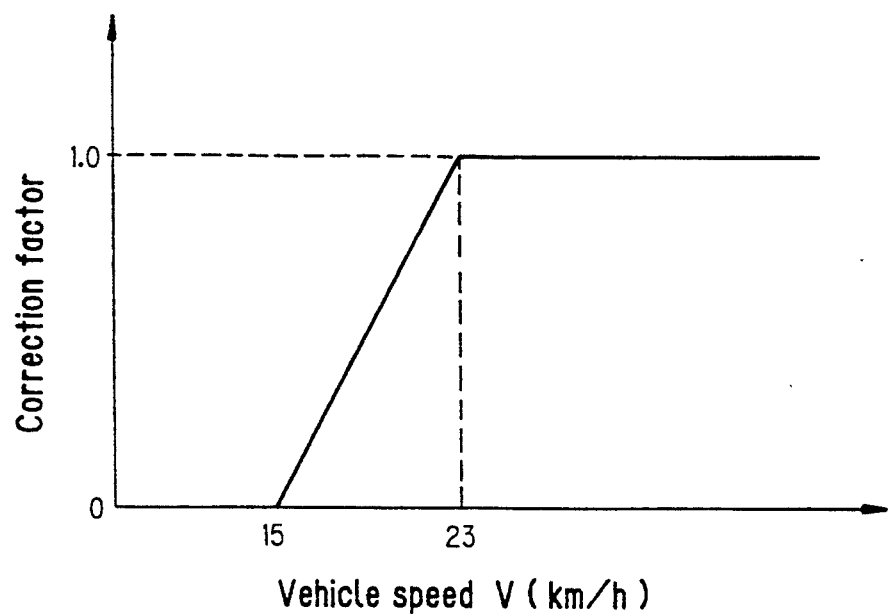
FIG. 18 is a graph showing the relationship between vehicle speed and correction factor.

For example, referring to FIG. 17 showing an example of an abnormality detection procedure, TCL 76 first detects an abnormality by an open circuit as shown in FIG. 16 in step W1. When it is determined not to be an abnormality, it is then determined in step W2 whether or not there is an abnormality in front wheel rotation sensor 66 and rear wheel rotation sensors 80 and 81. When, in step W2, rotation sensors 66, 80, and 81 are determined not to have an abnormality, a determination is made in step W3 as to whether or not steering shaft 83 has rotated more than one turn, for example, more than 400 degrees, in the same direction. When it is determined in step W3 that steering shaft 83 has been steered or turned more than 400 degrees in the same direction, a determination is made in step W4 as to whether or not there is a signal to notice reference position $\delta_N$ of steering shaft 83 from steering shaft reference position sensor 86.

When, in step W4, it is determined that there is no signal to notice reference position $\delta_N$ of steering shaft 83, since there should be at least one signal to notice reference position $\delta_N$ of steering shaft 83 if steering shaft reference position sensor 86 is normal, steering angle sensor 84 is determined as being abnormal in step W4, and an abnormality occurrence flag $F_W$ is set.

When, in step W3, it is determined that steering shaft 83 has not been steered more than 400 degrees in the same direction, or when, in step W4, it is determined that there is a signal to notice reference position $\delta_N$ of steering shaft 83 from steering shaft reference position sensor 86, a determination is made in step W6 as to whether or not neutral position $\delta_M$ has been learned. That is, it is determined whether or not at least one of the two steering angle neutral position learned flags, $F_{HN}$ or $F_H$, is set.

When, in step W6, it is determined that learning of neutral position $\delta_M$ of steering shaft 83 has finished, and when it is determined in step W7 that rear wheel speed difference $|V_{RL}-V_{RR}|$ exceeds, for example, 1.5 km per hour, vehicle speed V is between, for example, 20 km per hour and 60 km per hour in step W8, and the absolute value of turning angle $\delta_H$ of steering shaft 83 is, for example, less than 10 degrees in step W9, that is, when vehicle 82 is turning at a certain degree of speed, the absolute value of turning angle $\delta_H$ should be more than 10 degrees if steering angle sensor 84 is functioning normally, then steering angle sensor 84 is determined to be abnormal in step W10.

Slip correction amount $V_{KC}$ corresponding to target lateral acceleration $G_{YO}$ is set to a value smaller than slip correction amount $V_{KC}$ corresponding to corrected lateral acceleration $G_{YF}$ in the range of small target lateral acceleration $G_{YO}$ in view of an additional turning of steering wheel 85 by the driver. Since it is preferable to ensure acceleration of vehicle 82 in the range of small vehicle speed V, and, to the contrary, it is necessary to consider ease of turning at a vehicle speed V of more than a certain value, the slip correction amount $V_{KC}$ read from FIG. 39 is multiplied by a correction factor corresponding to vehicle speed V read from the graph of FIG. 42, to calculate a corrected slip correction amount $V_{KF}$.

This reduces correction torque calculation target front wheel speed $V_{FO}$. Further, slip rate S during turning becomes smaller than target slip rate $S_O$ during straightforward running. Finally, acceleration performance of vehicle 82 becomes slightly lowered, but good turning performance is assured.

Figure 19:
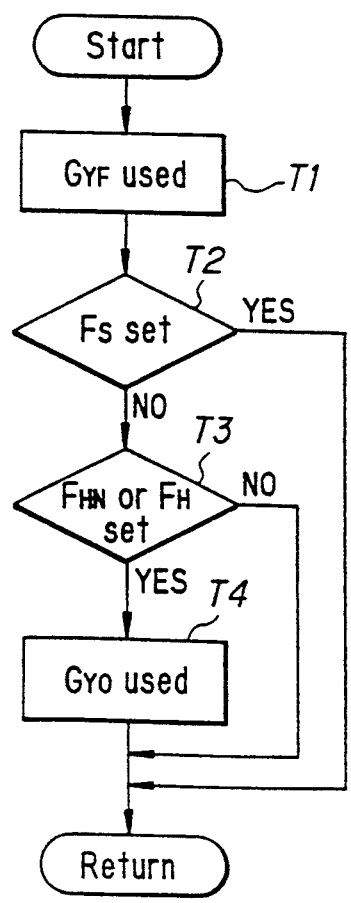
FIG. 19 is a flow chart showing lateral acceleration selection flow.

Referring to FIG. 19 showing the selection procedure of target lateral acceleration $G_{YO}$ and actual lateral acceleration $G_Y$, TCL 76 adopts, in step T1, corrected lateral acceleration $G_{YF}$ from filtration unit 123 as the lateral acceleration to calculate slip correction amount $V_{KC}$. A determination is then made in step T2 as to whether or not slip control flag $F_s$ is set.

When, in step T2, it is determined that slip control flag $F_s$ is set, corrected lateral acceleration $G_{YF}$ is adopted. This is because, when lateral acceleration to determine slip correction amount $V_{KC}$ is changed from corrected lateral acceleration $G_{YF}$ to target lateral acceleration $G_{YO}$, slip correction amount $V_{KC}$ tends to be largely changed and the behavior of vehicle 82 tends to become disturbed.

When, in step T2, it is determined that slip control flag $F_s$ is not set, a determination is made in step T3 as to whether or not any of two steering angle neutral position learned flags $F_{HN}$ and $F_H$ is set. In this case, when both steering angle neutral position learned flags $F_{HN}$ and $F_H$ are determined as not being set, corrected lateral acceleration $G_{YF}$ is adopted, as is. When it is determined in step T3 that one of steering angle neutral position learned flags $F_{HN}$ and $F_H$ is set, target lateral acceleration $G_{YO}$ is adopted as the lateral acceleration to calculate slip correction amount $V_{KC}$ in step T4.

As a result, target front wheel speed $V_{FS}$ for correction torque calculation is $$V_{FS} = V_{FO} + V_K - V_{KF}$$

Then, slip amount s, which is the difference between actual front wheel speed $V_F$ obtained from filtration to remove noise from the detection signal from front wheel rotation sensor 66, and correction torque calculation target front wheel speed $V_{FS}$, is calculated by reduction unit 124. When slip amount s is less than the negative setting value, for example, $-2.5$ km per hour, the $-2.5$ km per hour is clipped as the slip amount s in clipping unit 125. The clipped slip amount s is subjected to proportional correction to be described later. This prevents overcontrol in proportional correction and further prevents the occurrence of hunting in the output.

Furthermore, slip amount s before clipping is integration corrected using $\Delta T_I$, to be described later. It is then differentiation corrected to calculate final correction torque $T_{PID}$.

Figure 20:
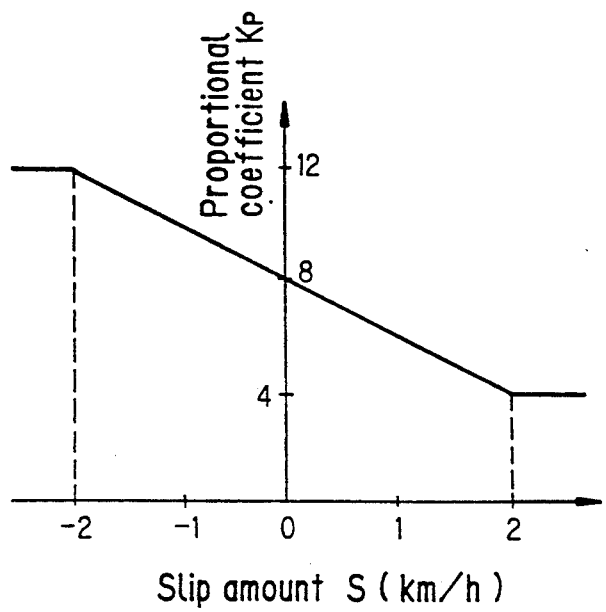
FIG. 20 is a graph showing the relationship between slip amount and proportional coefficient.

In the proportional correction, slip amount s is multiplied by proportional coefficient $K_P$ in multiplication unit 126 to obtain a basic correction amount. It is then multiplied in multiplication unit 127 by correction factor $\rho_{KP}$, previously set from speed change ratio $\rho_m$ of hydraulic automatic transmission 13, to obtain proportional correction torque $T_P$. Proportional coefficient $K_P$ is read from a graph shown in FIG. 20 according to the clipped slip amount s.

To achieve correction according to moderate changes in the slip amount s as the integration correction, a basic correction amount is calculated by integration calculation unit 128. The correction amount is the multiplied by correction factor $\rho_{KI}$ predetermined according to speed change ratio $\rho_m$ of hydraulic automatic transmission 13 in multiplication unit 129, to obtain integration correction torque $T_I$. In this embodiment, a constant small integration correction torque $\Delta T_I$ is integrated, and a small integration correction torque $\Delta T_I$ is added when the slip amount s is positive, every 15-millisecond sampling period, or, a small integration correction torque $\Delta T_I$ is subtracted when the slip amount s is negative.

Figure 21:
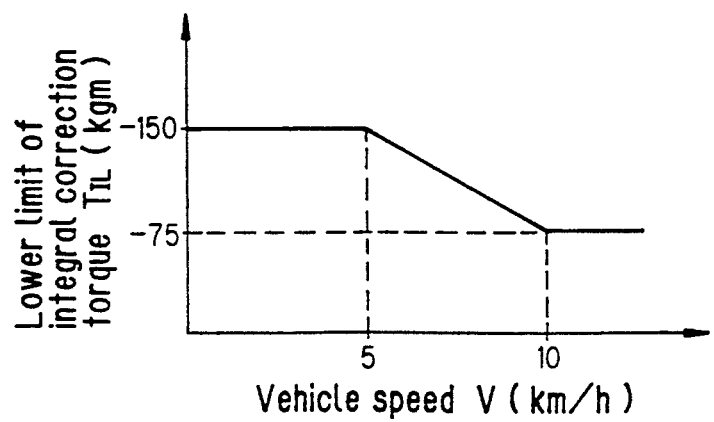
FIG. 21 is a graph showing the relationship between vehicle speed and the lower limit of integral correction torque.

However, for this integration correction, torque $T_I$ is set to a lower limit value $T_I$ as shown in a graph in FIG. 21, which is variable according to vehicle speed V. By this clipping, a large integration correction torque $T_I$ is applied at the starting of vehicle 82, especially at the start of an ascending slope, to ensure the driving torque of engine 11. Further, when vehicle speed V is increased after the starting of vehicle 82, integration correction torque $T_I$ is reduced because control tends to become unstable if correction is too large. Furthermore, an upper limit value, for example, 0 kgm, is set to enhance the convergence of control, and integration torque $T_I$ varies as shown in FIG. 22 by this clipping.

The thus calculated proportional correction torque $T_P$ is added to integration correction torque $T_I$ in addition unit 130 to calculate proportional integration correction torque $T_{PI}$.

Figures 22, 23:
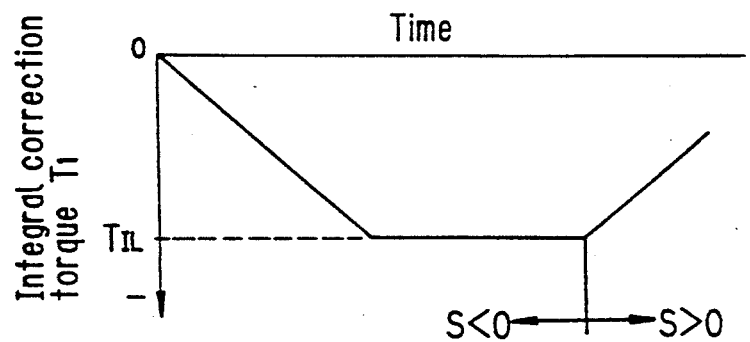
FIG. 22 is a graph showing a variable region of integral correction torque.
FIG. 23 is a graph showing the relationship between various speeds of a hydraulic automatic transmission and correction factors corresponding to various correction torques.

Correction factors $\rho_{KP}$ and $\rho_{KI}$ are read from a graph as shown in FIG. 23, which is previously set in relation to speed change ratio $\rho_m$ of hydraulic automatic transmission 13.

Furthermore, in this embodiment, changing rate $G_S$ of the slip amount s is calculated in differentiation calculation unit 131, and multiplied by differentiation coefficient $K_D$ in multiplication unit 132, to calculate a basic correction amount for rapid changes in the slip amount s. Further, an upper limit value and a lower limit value are individually set for the above obtained value, and a differentiation correction torque $T_D$ is clipped in clipping unit 133 to prevent it from becoming an extremely large value, to obtain differentiation correction torque $T_D$. Since, during the running of vehicle 82, wheel speeds $V_F$, $V_{RL}$, and $V_{RR}$ may become instantaneously skidded or locked, depending on the road condition or the running condition of vehicle 82, changing rate $G_S$ of the slip amount s may become an extremely larger positive or negative value. Further, control tends to diverge, resulting in a degraded response. The lower limit value is clipped, for example, to $-55$ kgm and the upper limit value is clipped to 55 kgm, to prevent the differentiation correction torque $T_D$ from becoming to extremely large in value.

Thereafter, proportional integration correction torque $T_{PI}$ is added to differentiation correction torque $T_D$ in addition unit 134. The resulting final correction torque $T_{PID}$ is subtracted in subtraction unit 116 from reference driving torque $T_B$, and further multiplied in multiplication unit 135 by a reciprocal of the total reduction ratio between engine 11 and wheel shafts 89 and 90 of front wheels 64 and 65, to obtain target driving torque $T_{OS}$ for slip control, as shown in equation (6) below:

$$T_{os} = \frac{T_B - T_{PID}}{\rho_m \cdot \rho_d \cdot \rho_T}. \qquad (6)$$

In the equation (6), $\rho_d$ is a differential gear reduction ratio, and $\rho_T$ is a torque converter ratio. Further, when hydraulic automatic transmission 13 performs an up-shift operation, speed change ratio $\rho_m$ of the high speed gear side is outputted after the completion of the speed shift operation. That is, during the up-shift operation of the hydraulic automatic transmission 13, if speed change ratio $\rho_m$ of the high speed gear side is adopted at the output of the speed shift signal, as can be seen from equation (6), target driving torque $T_{OS}$ tends to increase. This results in a racing of the engine 11 during the speed change. So, from the output of a signal to begin speed change, to the completion of the speed shift operation, for example, for 1.5 second, speed change ratio $\rho_m$ of the low speed gear side can be maintained where a low target driving torque $T_{OS}$ is maintained. Further, speed change ratio $\rho_m$ of the high speed gear side is adopted 1.5 second after the output of the speed shift starting signal. For the same reason, during a down-shift operation of the hydraulic automatic transmission 13, speed change ratio $\rho_m$ of the low speed side is immediately adopted at the time that the speed change signal is outputted.

Since target driving torque $T_{OS}$ calculated by equation (6) should naturally be a positive value, target driving torque $T_{OS}$ is clipped to a value above zero in clipping unit 136, in order to prevent miscalculation. Information on target driving torque $T_{OS}$ is outputted to ECU 15 according to determination processing in start/end determination unit 137, to determine the start or end of slip control.

Start/end determination unit 137 determines the start of slip control when all conditions of (a) through (e) below are met; sets slip control flag $F_S$; operates select switch 103 to select the output from low vehicle speed selection unit 101 as the slip control vehicle speed $V_S$; outputs information on target driving torque $T_{OS}$ to ECU 15; determines the end of slip control; and repeats the procedures until the end of slip control is determined and slip control flag $F_S$ is reset.

(a) The driver desires slip control by operating a manual switch (not shown).

(b) Driving torque $T_d$ required by the driver is greater than the smallest torque necessary to run vehicle 82, for example, 4 kgm or more.

Figure 24:
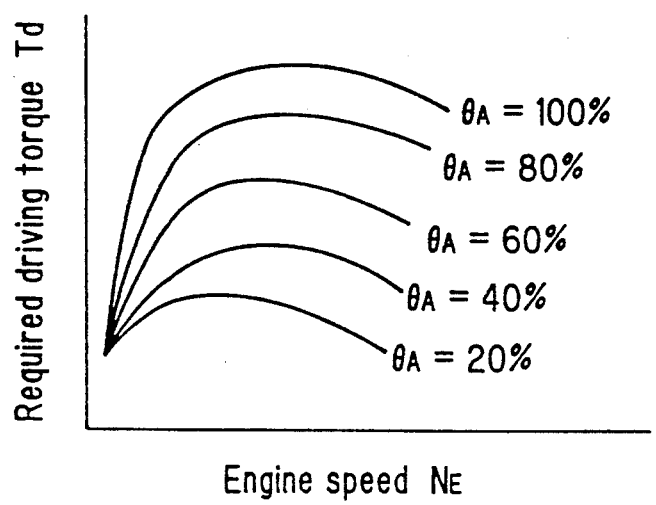
FIG. 24 is a graph showing the relationship between engine speed, required driving torque and accelerator opening.

In this embodiment, required driving torque $T_d$ is read from a graph as shown in FIG. 24 previously set according to engine rotation speed $N_E$ calculated from a detection signal from crank angle sensor 62 and accelerator opening $\theta_A$ calculated from a detection signal from accelerator opening sensor 76.

(c) Slip amount s is more than 2 km per hour.

(d) Changing rate $G_S$ of the slip amount s is more than 0.2 g.

(e) Actual front wheel acceleration $G_P$, which is actual front wheel speed $V_F$ time-differentiated in differentiation calculation unit 138, is more than 0.2 g. When any of the conditions of (f) and (g) below is met, after start/end determination unit 137 determines start of slip control, it is determined as the completion of slip control, slip control flag $F_S$ is reset, transmission of target driving torque $T_{OS}$ to ECU 15 is discontinued, and select switch 103 is operated to select the output from high vehicle speed selection unit 102 as the vehicle speed $V_S$ for slip control.

(f) A condition in which target driving torque $T_{OS}$ is greater than required driving torque $T_d$, and the slip amount s is less than a predetermined value, for example, less than $-2$ kg per hour, and has continued for more than a predetermined period of time, for example, more than 0.5 seconds.

(g) A condition in which idle switch 68 is turned from off to on, that is, the driver releases accelerator pedal 31, has continued for more than a predetermined period of time, for example, more than 0.5 seconds.

Vehicle 82 is provided with a manual switch (not shown) for the driver to select slip control. When the driver operates this manual switch to select slip control, the following slip control operation is carried out.

Figure 25:
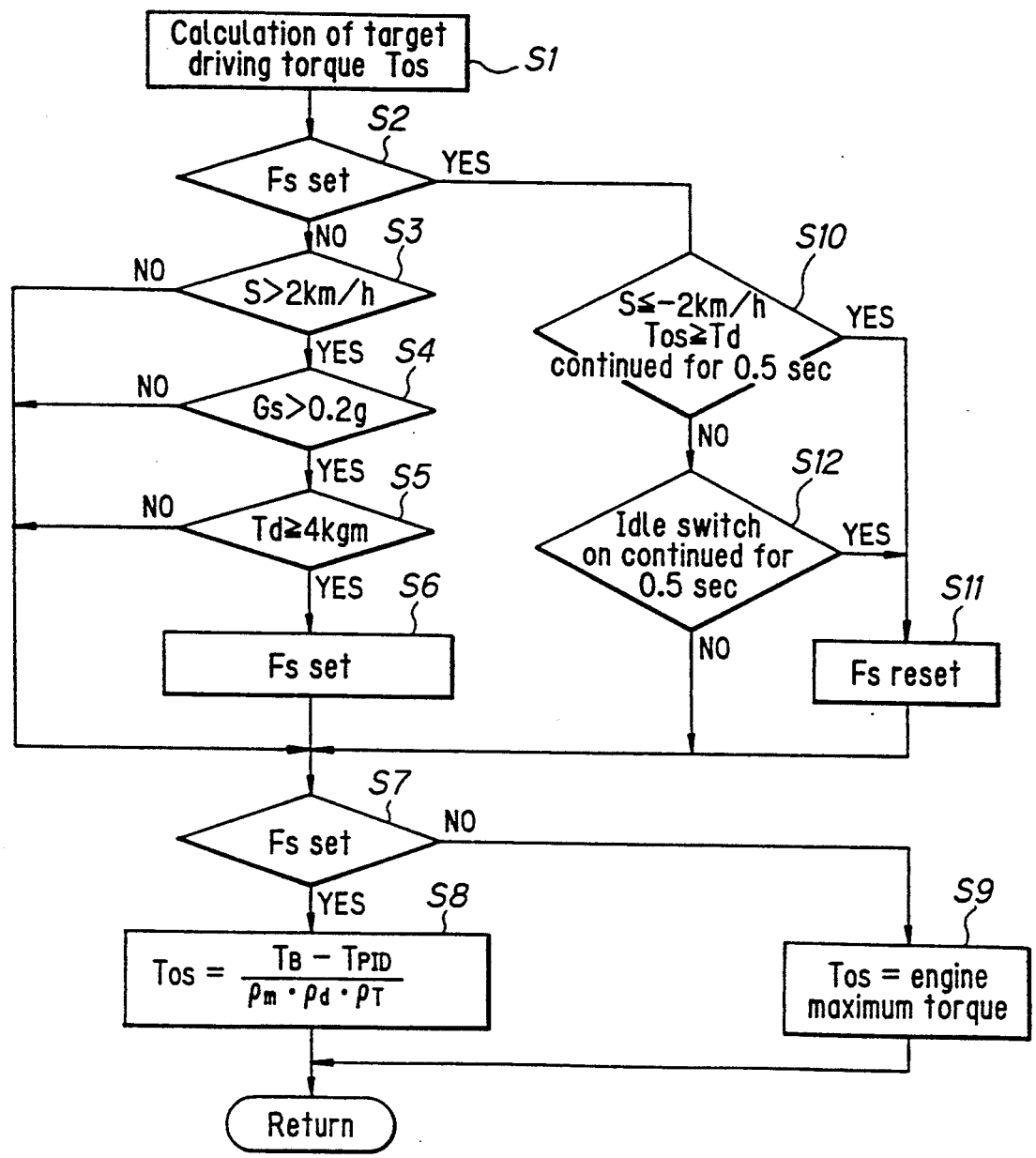
FIG. 25 is a flow chart showing slip control flow.

Referring to FIG. 25 which shows the slip control flow, TCL 75 in step S1 calculates target driving torque $T_{OS}$ by the detection of the above-described various data and calculation. However, this calculation operation is performed independently from operation of the manual switch.

Then, in step S2, a determination is made as to whether or not slip control flag $F_S$ is set. However, since a slip control flag $F_S$ is not initially set, TCL 76 determines in step S3 whether or not the slip amount s of the front wheels 64 and 65 is greater than a predetermined threshold value, for example, 2 km per hour.

When, in step S3, it is determined that the slip amount s is greater than 2 km per hour, TCL 76 determines in step S4 whether or not changing rate $G_S$ of the slip amount s is greater than 0.2 g.

In this step S4, when it is determined that slip amount changing rate $G_S$ is greater than 0.2 g, TCL 76 determines in step S5 whether or not the driver's required driving torque $T_d$ is greater than a minimum driving torque necessary to run vehicle 82, for example, greater than 4 kgm. That is, it determines whether or not the driver intends to run vehicle 82.

When, in step S5, it is determined that the required driving torque $T_d$ is greater than 4 kgm, that is, the driver intends to run vehicle 82, slip control flag $F_S$ is set in step S6. Further, a determination is again made in step S7 as to whether or not slip control flag $F_S$ is set.

When, in step S7, it is determined that slip control flag $F_S$ is set, slip control target driving torque $T_{OS}$, previously calculated by equation (6), is adopted in step S8 as target driving torque $T_{OS}$ for engine 11.

When, in step S7, it is determined that slip control flag $F_S$ is reset, TCL 76 in step S9 outputs a maximum torque of engine 11 as target driving torque $T_{OS}$, thereby reducing the duty ratio of torque control electromagnetic valves 51 and 56 to the 0% side. As a result, engine 11 outputs a driving torque according to the amount of pressure applied to the accelerator pedal 31 by the driver.

When, in step S3, it is determined that the slip amount s of front wheels 64 and 65 is smaller than 2 km per hour; or, in step S4, it is determined that slip amount changing rate $G_S$ is smaller than 0.2 g; or, in step S5, it is determined that required driving torque $T_d$ is smaller than 4 kgm, the processing proceeds to step S7. Further, in step S9, TCL 76 outputs the maximum torque of engine 11 as target driving torque $T_{OS}$, and ECU 15 reduces the duty ratio of torque control electromagnetic valves 51 and 56 to the 0% side. As a result, engine 11 generates a driving torque according to the amount of pressure applied to the accelerator pedal 31 by the driver.

On the other hand, when, in step S2, it is determined that slip control flag $F_S$ is set, a determination is made in step S10 as to whether or not the condition that the slip amount s of front wheels 64 and 65 is below $-2$ km, which is the above-described threshold value, and as to whether the required driving torque $T_d$ is below target driving torque $T_{OS}$, calculated in step S1, and has continued for 0.5 seconds or more.

When, in step S10, it is determined that the condition that the slip amount s is smaller than 2 km per hour and the required driving torque $T_d$ is below target driving torque $T_{OS}$ and has continued for 0.5 seconds or more, that is, the driver no longer requires acceleration of vehicle 82, in step S11, slip control flag $F_S$ is reset, and processing proceeds to step S7.

When, in step S10, it is determined that the condition that the slip amount s is greater than 2 km per hour, or the condition that the required driving torque $T_d$ is below target driving torque $T_{OS}$, and has not continued for 0.5 seconds or more, that is, the driver requires acceleration of vehicle 82, TCL 76 in step S12 determines whether or not the condition that idle switch 68 is on, that is, throttle valve 20 is fully closed, has continued for 0.5 seconds or more.

When, in step S12, it is determined that idle switch 68 is on, since the driver is not pressing down on accelerator pedal 31, processing proceeds to step S11 where slip control flag $F_S$ is reset. To the contrary, when it is determined that idle switch 68 is off, since the driver is pressing down on accelerator pedal 31, processing again proceeds to step S7.

When the driver does not operate the manual switch to select slip control, TCL 76 calculates slip control target driving torque $T_{OS}$, and then calculates the target driving torque of engine 11 for turning control.

Lateral acceleration $G_Y$ of vehicle 82 can be actually calculated by equation (5) using rear wheel speed difference $|V_{RL} - V_{RR}|$. However, since lateral acceleration $G_Y$ applied to vehicle 82 can be forecast using steering shaft turning angle $\delta_H$, rapid control can be achieved.

Specifically, for turning control of vehicle 82, TCL 76 calculates target lateral acceleration $G_{YO}$ of vehicle 82 by equation (3) from steering shaft turning angle $\delta_H$ and vehicle speed V, and an acceleration in the longitudinal direction of vehicle 82 of non-extreme understeering. That is, the target longitudinal direction acceleration $G_{XO}$ is set according to the target lateral acceleration $G_{YO}$. Further, target driving torque $T_{OC}$ of engine 11 corresponding to this target longitudinal direction acceleration $G_{XO}$ is calculated.

Figure 26:
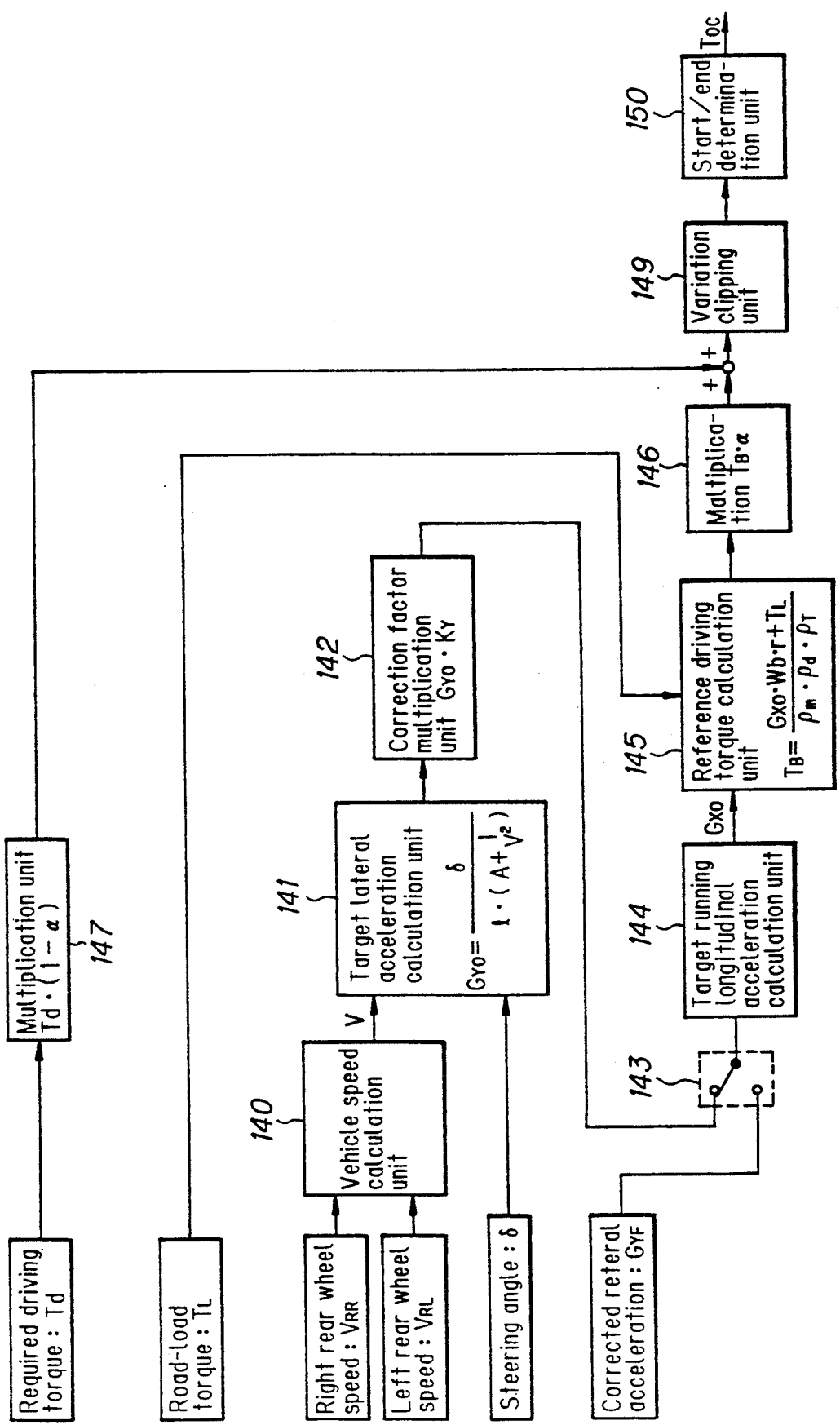
FIG. 26 is a block diagram showing a slip control target driving torque calculation procedure.
Figure 27:
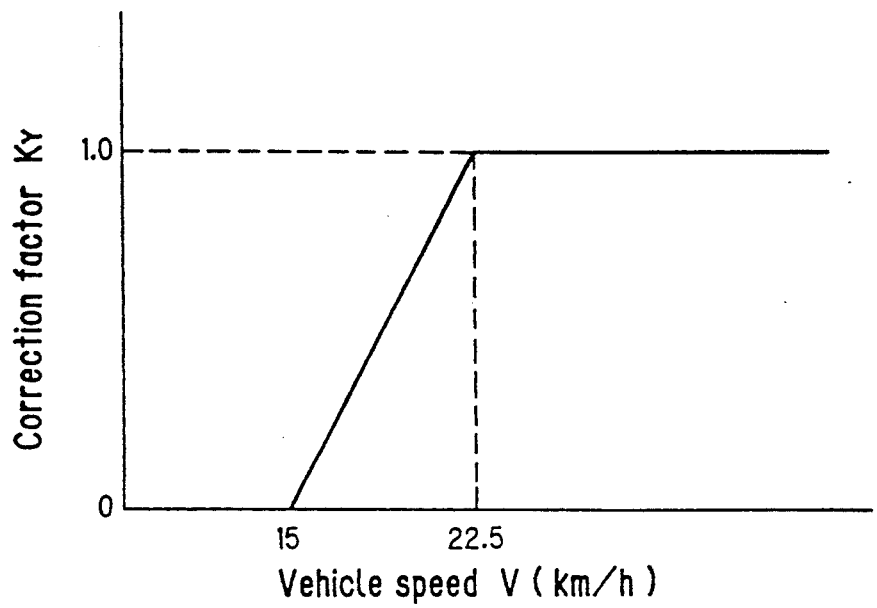
FIG. 27 is a graph showing the relationship between vehicle speed and correction factor.

As shown in FIG. 26, which is a turning control calculation block diagram, TCL 76 calculates vehicle speed V in vehicle speed calculation unit 140 by equation (1) from the output of a pair of rear wheel rotation sensors 80 and 81. It further calculates the steering angle $\delta$ of front wheels 64 and 65 by equation (2) according to a detection signal from steering angle sensor 84. Also, in target lateral acceleration calculation unit 141, target lateral acceleration $G_{YO}$ of vehicle 82, at this time, is also calculated by equation (3). In this case, in an area of small vehicle speed V, for example, less than 15 km per hour, sufficient turning can be achieved only by the driver's manipulation, and it is often better, in view of safety, to prohibit turning control, since a sufficient acceleration can be obtained when turning to the right or left at crowded crossroads. Therefore, in this embodiment, in correction factor multiplication unit 142, target lateral acceleration $G_{YO}$ is multiplied by correction factor $K_Y$ as shown in FIG. 27, according to vehicle speed V.

Since, in the state where learning of steering shaft the neutral position $\delta_H$ is not performed, it is problematic in view of reliability to calculate target lateral acceleration $G_{YO}$ by equation (3) according to steering angle $\delta$. It is desirable not to start turning control until learning of steering shaft neutral position $\delta_H$ is performed. When vehicle 82 traverses a curved road immediately after the beginning of running of the vehicle, vehicle 82 requires turning control. However, since the learning start condition of the steering angle neutral position is not readily satisfied, a problem occurs in that turning control is not yet started. Then, in this embodiment, select switch 143 is operated to enable turning control using corrected lateral acceleration $G_{YF}$ from filtration unit 123 by equation (19), until learning of steering shaft neutral position $\delta_H$ is performed. Thus, when both steering angle neutral position learned flags $F_{HN}$ and $F_H$ are reset, corrected lateral acceleration $G_{YF}$ is selected by select switch 143. Further, when at least one of steering angle neutral position learned flags $F_{HN}$ and $F_H$ is set, target lateral acceleration $G_{YO}$ from correction factor multiplication unit 142 is selected by select switch 143.

Figure 28:
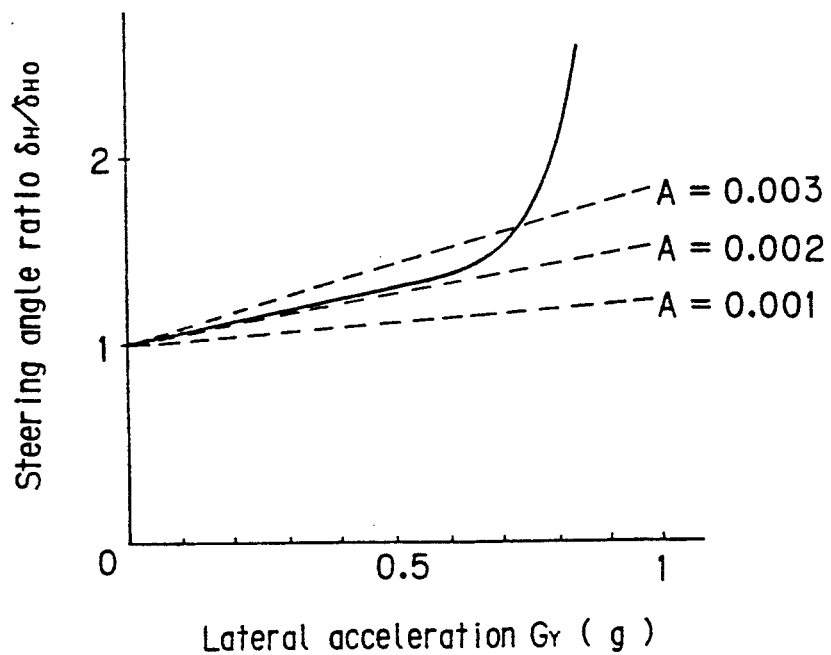
FIG. 28 is a graph showing the relationship between lateral acceleration and steering angle ratio for explaining a stability factor.

The stability factor A, as is well known, is determined by the suspension arrangement of vehicle 82 or characteristics of tires or road surface condition. Specifically, it is represented as the gradient of a tangential line in the graph, for example, as shown in FIG. 28. FIG. 28 shows the relationship between actual lateral acceleration $G_Y$ generated in vehicle 82 during steady circular turning and steering angle ratio $\delta_H/\delta_{HO}$ of steering shaft 83 at that time (the ratio of turning angle $\delta_H$ of steering shaft 83 at an acceleration to turning angle $\delta_{HO}$ of steering shaft 83 under extremely low-speed running condition where lateral acceleration $G_Y$ is in the vicinity of zero with respect to neutral position $\delta_M$ of steering shaft 83). Thus, in the area where lateral acceleration $G_Y$ is small and vehicle speed V is not so high, stability factor A is almost constant (A=0.002). However, when lateral acceleration $G_Y$ exceeds 0.6 g, stability factor A rapidly increases, and vehicle 82 exhibits a very strong understeering tendency.

As described above, based on FIG. 28 corresponding to a dry paved road surface (hereinafter referred to as a high $\mu$ road, $\mu$ being the coefficient of friction), stability factor A is set to 0.002, and the driving torque of engine 11 is controlled so that target lateral acceleration $G_{YO}$ of vehicle 82 calculated by equation (3) is less than 0.6 g.

For a slippery road surface such as frozen road, which is a low $\mu$ road, stability factor A may be set, for example, to about 0.005. In this case, since target lateral acceleration $G_{YO}$ is greater than actual lateral acceleration $G_Y$ on a low $\mu$ road, a determination is made as to whether or not target lateral acceleration $G_{YO}$ is greater than a predetermined threshold value, for example, $(G_{YF}-2)$. Further, when target lateral acceleration $G_{YO}$ is greater than the threshold value, vehicle 82 is determined as running on a low $\mu$ road. Thus, low $\mu$ road turning control may be performed as needed. Specifically, by adding 0.05 g to corrected lateral acceleration $G_{YF}$ calculated by equation (5), a determination is made as to whether or not target lateral acceleration $G_{YO}$ is greater than a predetermined threshold value since target lateral acceleration $G_{YO}$ is greater than actual lateral acceleration $G_y$ on a low $\mu$ road. When it is determined that target lateral acceleration $G_{YO}$ is greater than the threshold value, vehicle 82 is determined as running on a low $\mu$ road.

Figure 29:
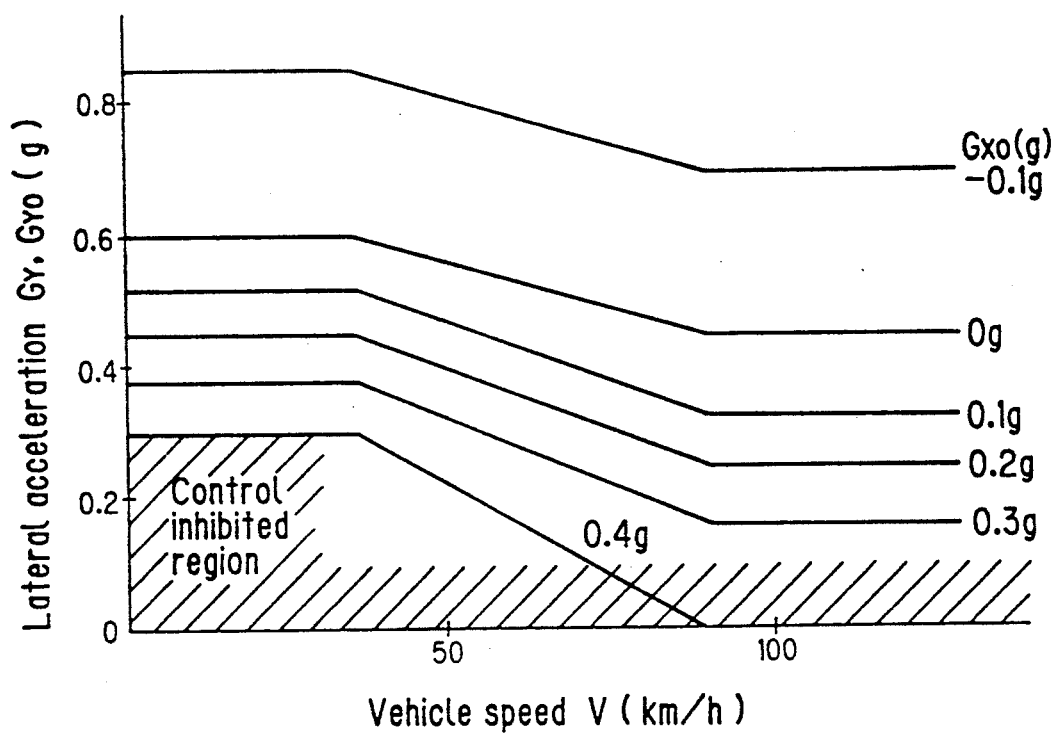
FIG. 29 is a graph showing the relationship between target lateral acceleration, target longitudinal direction acceleration and vehicle speed.
Figure 30:
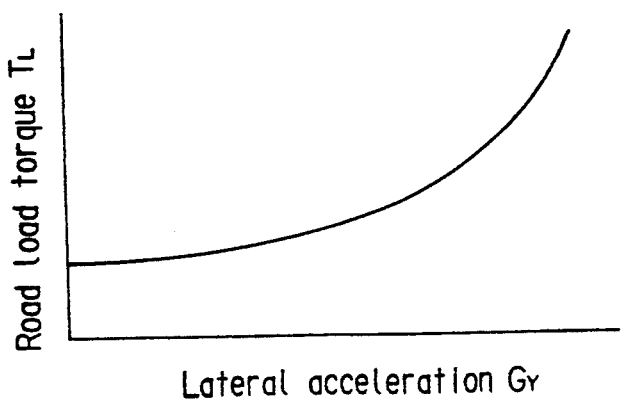
FIG. 30 is a graph showing the relationship between lateral acceleration and road-load torque.

After target lateral acceleration $G_{YO}$ is thus calculated, target longitudinal direction acceleration $G_{XO}$ of vehicle 82, previously set according to target lateral acceleration $G_{YO}$ and vehicle speed V, is read by target longitudinal direction acceleration calculation unit 144 from a graph as shown FIG. 29, which has been previously stored in TCL 76. Reference driving torque $T_B$ of engine 11 according to target longitudinal direction acceleration $G_{XO}$ is calculated in reference driving torque calculation unit 145 by equation (7).

$$T_B = \frac{G_{XO} \cdot W_b \cdot r + T_L}{\rho_m \cdot \rho_d \cdot \rho_T} \quad (7)$$

wherein, $T_L$ is a road-load torque which is a resistance of road surface determined as a function of lateral acceleration $G_Y$ of vehicle 82, and, in this embodiment, is determined from a graph as shown in FIG. 30.

In this case, by only calculating the target driving torque of engine 11 from steering shaft turning angle $\delta_H$ and vehicle speed V, the intention of the driver is not at all reflected, and the driver tends to feel dissatisfaction in his drivability of vehicle 82. Therefore, it is desirable to determine required driving torque $T_d$ of engine 11, which the driver desires, from the amount of pressure applied to accelerator pedal 31, and to set the target driving torque of engine 11 in consideration of the required driving torque $T_d$.

Then, in this embodiment, to determine adoption ratio of reference driving torque $T_B$, reference driving torque $T_B$ is multiplied, in multiplication unit 146, by a weighting factor $\alpha$ to determine a corrected reference driving torque. This weighting factor $\alpha$ is experimentally set by turning running vehicle 82. A value of approximately 0.6 is used for a high $\mu$ road.

Furthermore, required driving torque $T_d$ required by the driver, is determined from a graph as shown in FIG. 29 according to engine speed $N_E$ detected by crank angle sensor 55 and accelerator opening $\theta_A$ detected by accelerator opening sensor 77. Then, a corrected required driving torque according to weighting factor $\alpha$ is calculated by multiplying required driving torque $T_d$ by $(1-\alpha)$ in multiplication unit 147. For example, when $\alpha=0.6$ is set, the adoption ratio of reference driving torque $T_B$ and required driving torque $T_d$ is 6:4.

Therefore, target driving torque $T_{OC}$ of engine 11 is calculated by equation (8) in addition unit 148.

$$T_{OC} = \alpha \cdot T_B + (1-\alpha) \cdot T_d \quad (8)$$

Since, when fluctuation of target driving torque $T_{OC}$ of engine 11, set every 15 milliseconds, is very large, shocks tend to occur in association with acceleration and retardation of vehicle 82, which causes a deteriorated driving feeling. When a fluctuation of target driving torque $T_{OC}$ of engine 11 becomes so large that it causes a deteriorated drive feeling, it is desirable to regulate changes in target driving torque $T_{OC}$.

In this embodiment, when the absolute value $|\Delta T|$ of the difference between target driving torque $T_{OC(n)}$, presently calculated by changing value clipping unit 149 and previously calculated target driving torque $T_{OC(n-1)}$, is smaller than an allowance value $T_K$, the presently calculated target driving torque $T_{OC(n)}$ is adopted as is. However, the difference $\Delta T$ between presently calculated target driving torque $T_{OC(n)}$ and previously calculated target driving torque $T_{OC(n-1)}$ is not greater than negative allowance value $T_K$, and present target driving torque $T_{OC(n)}$ is set by the following equation.

$$T_{OC(n)} = T_{OC(n-1)} - T_K$$

Thus, the decrease to previously calculated target driving torque $T_{OC(n-1)}$ is regulated by change allowance $T_K$ to reduce retardation shock associated with the decreasing driving torque of engine 11. Furthermore, when difference $\Delta T$ between the presently calculated target driving torque $T_{OC}$ and the previously calculated target driving torque $T_{OC(n-1)}$ is greater than change allowance $T_K$, the present target driving torque $T_{OC}$ is corrected by the following equation.

$$T_{OC} = T_{OC(n-1)} + T_K$$

Thus, when the difference $\Delta T$ between presently calculated target driving torque $T_{OC}$ and previously calculated target driving torque $T_{OC(n-1)}$ exceeds change allowance $T_K$, an increase to previously calculated target driving torque $T_{OC(n-1)}$ is regulated by change allowance $T_K$ to reduce acceleration shock associated with increasing driving torque of engine 11.

Then, according to the determination processing in start/end determination unit 150 to determine beginning or completion of turning control, information on target driving torque $T_{OC}$ is outputted to ECU 15.

Start/end determination unit 150 determines the beginning of turning control when all conditions of (a) through (d) below are met, turning control flag $F_C$ being set, outputs information on target driving torque $T_{OC}$ to ECU 15, and continues this procedure until the completion of turning control is determined and turning control flag $F_C$ is reset.

(a) Target driving torque $T_{OC}$ is less than a value of required driving torque $T_d$, subtracted by a threshold value, for example, 2 kgm.
(b) The driver desires turning control by operating a manual switch (not shown).
(c) Idle switch 68 is off.
(d) Control system for turning is normal.

On the other hand, when start/end determination unit 150 determines the beginning of turning control, and when any one of the conditions (e) and (f) below is met, it is determined as the completion of turning control, turning control flag $F_C$ is reset, and transmission of target driving torque $T_{OC}$ to ECU 15 is discontinued.

(e) Target driving torque $T_{OS}$ is greater than required driving torque $T_d$.
(f) The control system for turning has an abnormality such as a malfunction or an open circuit.

There is naturally a proportional relationship between output voltage of accelerator opening sensor 77 and accelerator opening $\theta_A$. Further, accelerator opening sensor 77 is mounted to throttle body 21 so that the output voltage of accelerator opening sensor 77 is, for example, 0.6 volts when accelerator opening $\theta_A$ is fully closed. However, it is substantially impossible to restore the original mounting condition of accelerator opening sensor 77 after accelerator opening sensor 77 is removed from throttle body 21 and replaced, such as is necessary due to the servicing of vehicle 82, and the position of accelerator opening sensor 77 may change with time, relative to throttle body 21.

Then, in this embodiment, the full-close position of accelerator opening sensor 77 is learning corrected, thereby ensuring reliability of accelerator opening $\theta_A$ calculated according to a detection signal from accelerator opening sensor 77.

Figure 31:
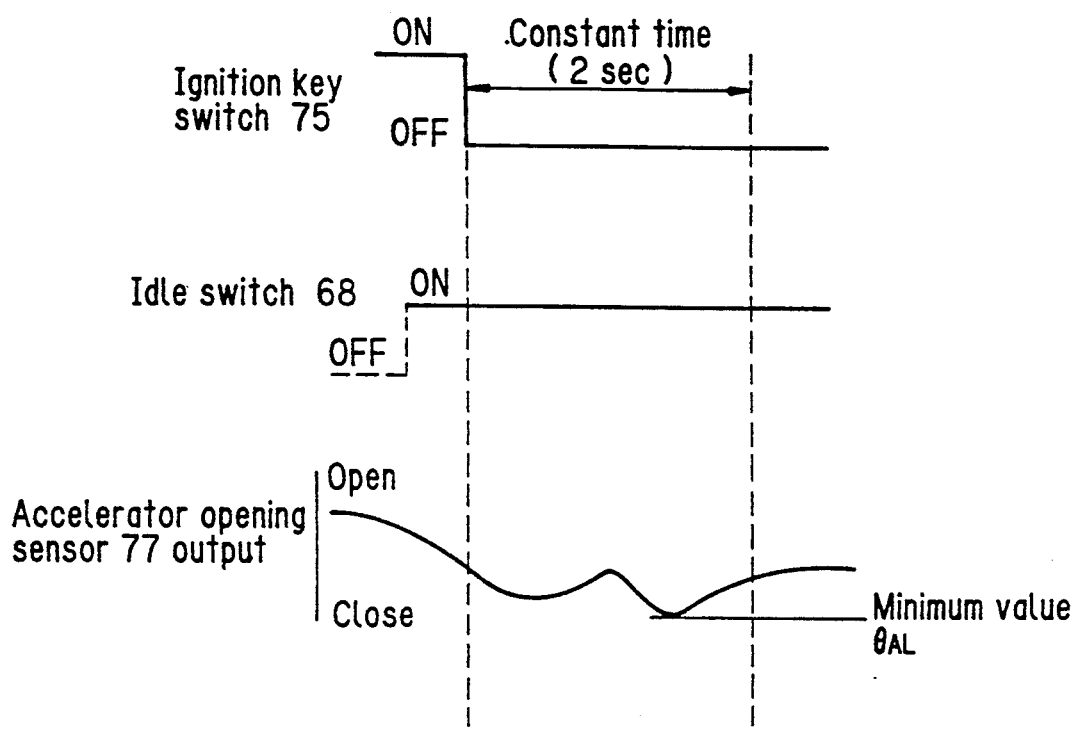
FIG. 31 is a graph showing an example of learning correction procedure of a fully closed position of an accelerator opening sensor.

Referring to FIG. 31 showing the full-close position learning procedure of accelerator opening sensor 77, after idle switch 68 is on and ignition key switch 75 is turned from on to off, output of accelerator opening sensor 77 is monitored for a predetermined period of time, for example, for 2 seconds. Subsequently, a lowest value of accelerator opening sensor 77 output is taken in as a full-close position of accelerator opening sensor 77. This is stored in a RAM with backup (not shown) incorporated in ECU 15. Then, accelerator opening $\theta_A$ is corrected with respect to the lowest output of accelerator opening sensor 77 until the next learning.

However, when a battery (not shown) incorporated in vehicle 82 is removed, memory of the RAM is lost. In such a case, learning procedure shown in FIG. 32 is adopted.

Thus, TCL 76 determines in step A1 whether or not full-close position value $\theta_{AC}$ of accelerator opening $\theta_A$ is stored in the RAM. Further, when it is determined in step A1 that full-close position value $\theta_{AC}$ of accelerator opening $\theta_A$ is not stored in the RAM, initial value $\alpha\theta_{A(O)}$ is stored in the RAM in step A2.

On the other hand, when it is determined in step A1 that full-close position value $\theta_{AC}$ of accelerator opening $\theta_A$ is stored in the RAM, a determination is made in step A3 as to whether or not ignition key switch 75 is on. When it is determined that ignition key switch 75 is changed from on to off, the counting of a learning timer (not shown) is started in step A4. After the counting of the learning timer is started, a determination is made in step A5 as to whether or not idle switch 68 is on.

When it is determined in step A5 that idle switch 68 is off, a determination is made in step A6 that the count of the learning timer has reached a predetermined value, for example, 2 seconds. Processing reverts back to step A5. When it is determined in step A5 that idle switch 68 is on, output of accelerator opening sensor 77 is read in step A7 at a predetermined period, and a determination is made in step A8 whether or not present accelerator opening $\theta_{A(n)}$ is smaller than minimum value $\theta_{AL}$ of previous accelerator opening $\theta_A$.

When it is determined that present accelerator opening $\theta_{A(n)}$ is greater than minimum value $\theta_{AL}$ of previous accelerator opening $\theta_A$, minimum value $\theta_{AL}$ of previous accelerator opening $\theta_A$ is maintained as is. On the contrary, however, when it is determined that present accelerator opening $\theta_{A(n)}$ is smaller than minimum value $\theta_{AL}$ of previous accelerator opening $\theta_A$, present accelerator opening $\theta_{A(n)}$ is adopted in step A9 as the new minimum value $\theta_{AL}$. This procedure is repeated until the count of the learning timer reaches the predetermined value, for example, 2 seconds, in step A6.

When count of the learning timer reaches the predetermined value, a determination is made in step A10 as to whether or not minimum value $\theta_{AL}$ of accelerator opening $\theta_A$ is between predetermined clipping values, for example, between 0.3 V and 0.9 V. When it is determined that minimum value $\theta_{AL}$ of accelerator opening $\theta_A$ is within the clipping range, initial value $\theta_{A(O)}$ or full-close position value $\theta_{AC}$ of accelerator opening $\theta_A$ is brought closer in the direction of minimum value $\theta_{AL}$ by a constant value, for example, by 0.1 V. Subsequently, the result is adopted in step A11 as the full-close position value $\theta_{AC(n)}$ of accelerator opening $\theta_A$ of the present learning. Thus, when initial value $\theta_{A(O)}$ or full-close position value $\theta_{AC}$ of accelerator opening $\theta_A$ is greater than its minimum value $\theta_{AL}$, it is set as $$\theta_{AC(n)} = \theta_{AC(O)} - 0.1$$

or $$\theta_{AC(n)} = \theta_{AC(n-1)} - 0.1.$$

However, to the contrary, when initial value $\theta_{A(O)}$ or full-close position value $\theta_{AC}$ of accelerator opening $\theta_A$ is smaller than its minimum value $\theta_{AL}$, it is set as $$\theta_{AC(n)} = \theta_{AC(o)} + 0.1$$

or $$\theta_{AC(n)} = \theta_{AC(n-1)} + 0.1.$$

When it is determined in step A10 that minimum value $\theta_{AL}$ of accelerator opening $\theta_A$ is out of the predetermined clipping range, in step A12, the clipping value which is out of the range is replaced as minimum value $\theta_{AL}$ of accelerator opening $\theta_A$. Processing then proceeds to step A11 where full-close position value $\theta_{AC}$ of accelerator opening $\theta_A$ is learning corrected.

Thus, by setting upper and lower limit values of minimum value $\theta_{AL}$ of accelerator opening $\theta_A$, incorrect learning due to a malfunction of accelerator opening sensor 77 can be prevented. Further, by setting the amount of learning, at one time, to a constant value, incorrect learning due to external disturbance such as noise can be prevented.

In the above-described embodiment, the timing for starting the learning of full-close position value $\theta_{AC}$ of accelerator opening $\theta_A$ is set with respect to the time at which ignition key switch 75 is changed from on to off. However, alternatively, a seat sensor incorporated in a seat (not shown) may be used, wherein the driver leaving the seat is detected using changes in seat pressure or is position detected by the seat sensor, even when ignition key switch 75 is on, to begin learning of step A4 and beyond. Alternatively, it is also possible that a door-lock system (not shown), externally manipulated, is detected, or, a key entry system is used to detect that the door-lock system is manipulated, to begin learning of full-close position value $\theta_{AC}$ of accelerator opening sensor 77. In addition, learning may be performed when a shift lever (not shown) of the hydraulic automatic transmission 13 is positioned at the neutral or parking position (neutral position for a vehicle with a manual transmission), and an air-conditioning system is off, that is, when the vehicle is not in an idle up state.

Vehicle 82 is provided with a manual switch (not shown) for the driver to select turning control. When the driver selects this switch for turning control, the following turning control operation is performed.

Figure 33:
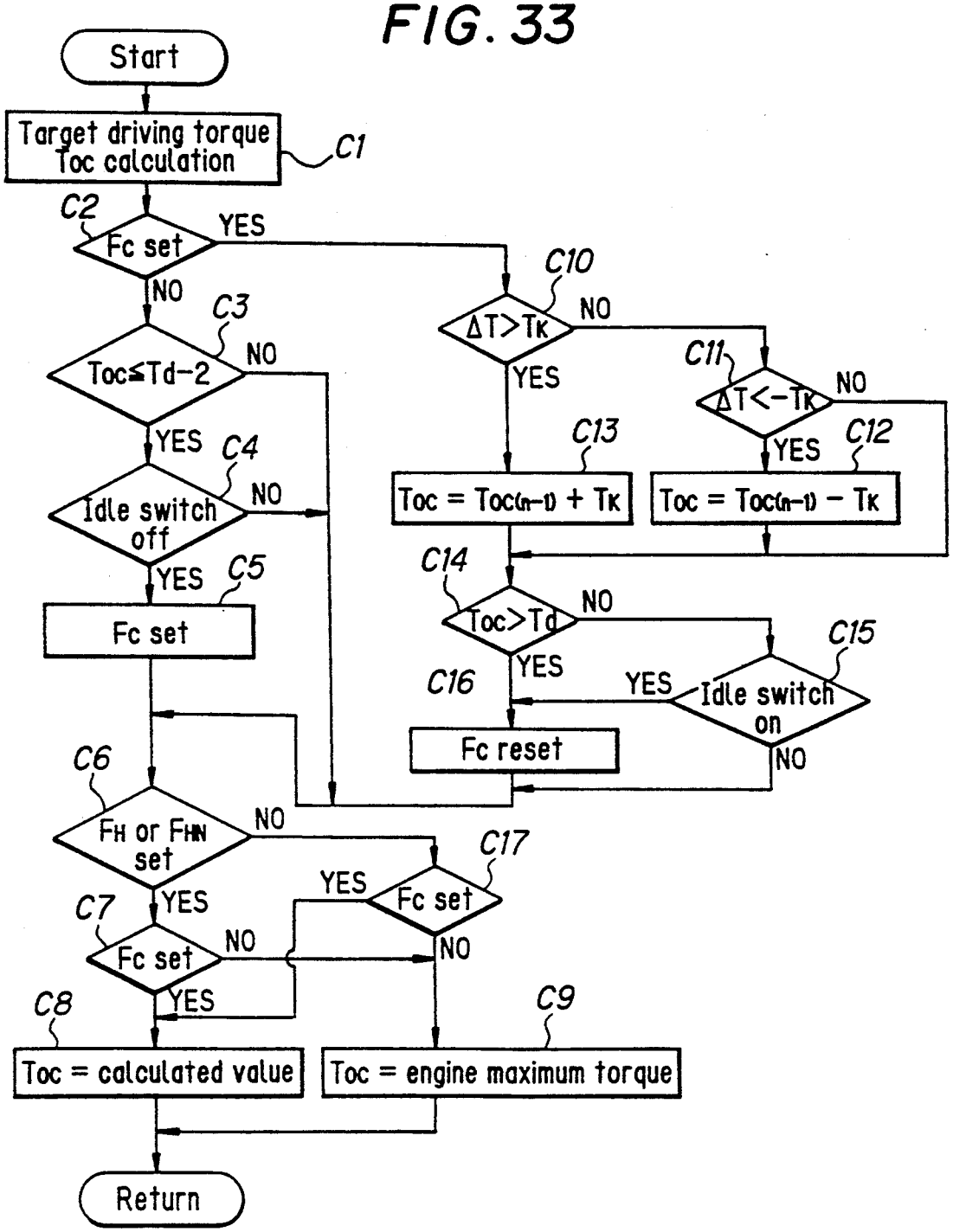
FIG. 33 is a flow chart showing turning control flow.

Referring to FIG. 33 showing control flow to determine target driving torque $T_{OC}$ for turning control, target driving torque $T_{OC}$ is calculated in step C1 by detection and calculation of various data, independent of operation of the manual switch.

Then, a determination is made in step C2 as to whether or not vehicle 82 is under turning control, that is, whether or not turning control flag $F_C$ is set. Since initially, vehicle 82 is not under turning control, and turning control flag $F_C$ is determined as being in the reset state, a determination is made in step C3 as to whether or not it is smaller than $(T_d-2)$. That is, target driving torque $T_{OC}$ can be calculated even when vehicle 82 is running straightforward, but the value is normally greater than the required driving torque $T_d$ of the driver. However, since the required driving torque $T_d$ is generally small during the turning of vehicle 82, the time when target driving torque $T_{OC}$ becomes a value below the threshold value $(T_d-2)$ is determined as the starting condition for turning control.

This threshold value is set to $(T_d-2)$ as a hysteresis to prevent the hunting of control.

When it is determined in step C3 that target driving torque $T_{OC}$ is below the threshold value $(T_d-2)$, TCL 76 determines in step C4 whether or not idle switch 68 is off.

When it is determined in step C4 that idle switch 68 is off, that is, accelerator pedal 31 is pressed down by the driver, turning control flag $F_C$ is set in step C5. Then, a determination is made in step C6 as to whether or not at least one of two steering angle neutral position learned flags $F_{HN}$ and $F_H$ is set, that is, authenticity of steering angle $\delta$ detected by steering angle sensor 84 is determined.

When it is determined in step C6 that at least one of two steering angle neutral position learned flags $F_{HN}$ and $F_H$ is set, a determination is made again in step C7 as to whether or not turning control flag $F_C$ is set.

In the above procedures, since turning control flag $F_C$ is set in step C5, it is determined that in step C7 that turning control flag $F_C$ is set. Thus, the previously calculated target driving torque $T_{OC}$, in step C1, is adopted, as is, in step C8, as target driving torque $T_{OH}$.

On the other hand, even when it is determined in step C6 that both steering angle neutral position learned flags $F_{HN}$ and $F_H$ are not set, a determination is again made in step C17 as to whether or not turning control flag $F_C$ is set. When it is determined in step C17 that turning control flag $F_C$ is set, processing proceeds to step C8. However, target driving torque $T_{OC}$ of equation (8) according to corrected lateral acceleration of equation (5) is adopted as turning control target driving torque $T_{OC}$, since the steering angle $\delta$ calculated by equation (2) is incredible.

When it is determined in step C17 that turning control flag $F_C$ is not set, target driving torque $T_{OC}$ calculated by equation (8) is not adopted. TCL 76 outputs in step C9 a maximum torque of engine 11 as target driving torque $T_{OC}$, which causes ECU 15 to reduce the duty ratio of torque control electromagnetic valves 51 and 56 to the 0% side, and engine 11 generates driving torque according to the amount of pressure applied to the accelerator pedal 31 by the driver.

When it is determined in step C3 that target driving torque $T_{OC}$ is not smaller than threshold value $(T_d-2)$, processing does not go to turning control, but instead goes to step C6 or steps C7 to C9, where TCL 76 outputs a maximum torque of engine 11 as target driving torque $T_{OC}$. This causes ECU 15 to reduce the duty ratio of torque control electromagnetic valves 51 and 56 to the 0% side, and engine 11 generates driving torque according to the amount of pressure applied to the accelerator pedal 31 by the driver.

Similarly, when it is determined in step C4 that idle switch 68 is on, that is, the accelerator pedal 31 is not pressed by the driver, TCL 76 outputs a maximum driving torque of engine 11 as target driving torque $T_{OC}$. This causes ECU 15 to reduce the duty ratio of torque control electromagnetic valves 51 and 56 to the 0% side, and engine 11 generates a driving torque according to the amount of pressure applied to the accelerator pedal 31 by the driver, and does not proceed to turning control.

When, in step C2, it is determined that turning control flag $F_C$ is set, a determination is made in step C10 as to whether or not the difference $\Delta T$ between the presently calculated target driving torque $T_{OC}$ and the previously calculated target driving torque $T_{OC(n-1)}$ is greater than a predetermined change allowance $T_K$. This change allowance $T_K$ is a torque change such that the passenger feels no speed change shock, for example. When target longitudinal direction acceleration $G_{XO}$ of vehicle 82 is to be suppressed to 0.1 g per second, it is determined using above equation (7) as $$T_K = 0.1 \cdot \frac{W_b \cdot r}{\rho_m \cdot \rho_d \cdot \rho_T} \cdot \Delta t.$$

When, in step C10, it is determined that the difference $\Delta T$ between the presently calculated target driving torque $T_{OC}$ and the previously calculated target driving torque $T_{OC(n-1)}$ is not greater than a predetermined change allowance $T_K$, a determination is made in step C11 as to whether or not the difference $\Delta T$ between the presently calculated target driving torque $T_{OC}$ and the previously calculated target driving torque $T_{OC(n-1)}$ is greater than the negative change allowance $T_K$.

When, in step C11, it is determined that the difference $\Delta T$ between the presently calculated target driving torque $T_{OC}$ and the previously calculated target driving torque $T_{OC(n-1)}$ is greater than the negative change allowance $T_K$, since the absolute value of the difference $|\Delta T|$ between the presently calculated target driving torque $T_{OC}$ and the previously calculated target driving torque $T_{OC(n-1)}$ is smaller than a change allowance $T_K$, the presently calculated target driving torque $T_{OC}$ is adopted, as is, as the target driving torque $T_{OC}$ in step C8.

When, in step C11, it is determined that a difference $\Delta T$ between the presently calculated target driving torque $T_{OC}$ and the previously calculated target driving torque $T_{OC(n-1)}$ is not greater than a negative change allowance $T_K$, the present target driving torque $T_{OC}$ is corrected in step C12 by the following equation, and adopted as the calculated value in step C8.

$$T_{OC} = T_{OC(n-1)} - T_K$$

That is, decrease of the previously calculated target driving torque $T_{OC(n-1)}$ is regulated by the change allowance $T_K$ to reduce the retardation shock associated with decreasing driving torque of engine 11.

On the other hand, when, in step C10, it is determined that a difference $\Delta T$ between the presently calculated target driving torque $T_{OC}$ and the previously calculated target driving torque $T_{OC(n-1)}$ is greater than a change allowance $T_K$, the present target driving torque $T_{OC(n)}$ is corrected in step C13 by the following equation, and adopted as calculated value in step C8.

$$T_{OC} = T_{OC(n-1)} + T_K$$

In the case of increasing driving torque, similar to the case of decreasing driving torque described above, when a difference $\Delta T$ between the presently calculated target driving torque $T_{OC}$ and the previously calculated target driving torque $T_{OC(n-1)}$ exceeds a change allowance $T_K$, increase to a previously calculated target driving torque $T_{OC(n-1)}$ is regulated by the change allowance $T_K$, to reduce acceleration shock associated with increasing driving torque of engine 11.

Once target driving torque $T_{OC}$ is set, TCL 76 determines whether or not this target driving torque $T_{OH}$ is greater than required driving torque $T_d$ of the driver.

Since target driving torque $T_{OC}$ is not greater than driving torque $T_d$ required by the driver when turning control flag $F_C$ is set, a determination is made in step C15 as to whether or not idle switch 68 is on.

When, in step C15, it is determined that idle switch 68 is on, processing goes to step C6 because turning control is required. When, in step C7, it is determined that turning control flag $F_C$ is set, or, in step C17, it is determined that turning control flag $F_C$ is set, the calculated value adopted in step C1 or step C12 or step C13 is selected as turning control target driving torque $T_{OC}$.

When, in step C14, it is determined that target driving torque $T_{OC}$ is greater than required driving torque $T_d$ of the driver, which means completion of turning of vehicle 82, in step C16, TCL 76 resets turning control flag $F_C$. Similarly, when it is determined in step C15 that idle switch 68 is on, that is, the accelerator pedal is not pressed down, processing proceeds to step C16 where turning control flag $F_C$ is reset.

When, in step C16, turning control flag $F_C$ is reset, TCL 76 outputs a maximum driving torque of engine 11 as target driving torque $T_{OC}$. This causes ECU 15 to reduce the duty ratio of torque control electromagnetic valves 51 and 56 to the 0% side, and engine 11 generates driving torque according to the amount of pressure applied to the accelerator pedal 31 by the driver.

It is of course possible to ignore the driving torque $T_d$ required by the driver in order to simplify the above-described turning control procedure. In this case, reference driving torque $T_B$, which can be calculated by equation (7), may be adopted as a target driving torque. Furthermore, even when driving torque $T_d$ required by the driver is taken into consideration as in this embodiment, rather than the constant weighting factor $\alpha$, the factor $\alpha$ may be gradually decreased with time after the beginning of control, or the factor $\alpha$ may be gradually decreased with vehicle speed, and the ratio of required driving torque $T_d$ may be gradually increased. Similarly, the factor $\alpha$ may remain constant for a period of time after the beginning of control, and then can be decreased. Alternatively, the factor $\alpha$ may be increased with increasing steering shaft turning amount $\delta_H$, especially to run vehicle 82 safely along a turning road of which the curvature radius gradually decreases.

In the above-described embodiment, the high $\mu$ road target driving torque is calculated. However, alternatively, turning control target driving torques $T_{OH}$ and $T_{OL}$ for high $\mu$ road and low $\mu$ road may be individually calculated, and a final target driving torque be selected from these target driving torques. Furthermore, in the above calculation method, regulation is applied to target driving torque $T_{OC}$ by change allowance $T_K$, in order to prevent speed change shocks due to rapid changes in driving torque of engine 11. However, this regulation may alternatively be applied to target longitudinal direction acceleration $G_{XO}$.

After target driving torque $T_{OC}$ for turning control is calculated, TCL 76 selects optimum final target driving torque $T_O$ from among these two target driving torques $T_{OS}$ and $T_{OC}$, and outputs this to ECU 15. In this case, the smaller target driving torque is preferentially outputted, in view of running safety of vehicle 82. However, in general, since slip control target driving torque $T_{OS}$ is always smaller than turning control target driving torque $T_{OC}$, final target driving torque $T_O$ may be selected in the order of slip control and turning control.

Figure 34:
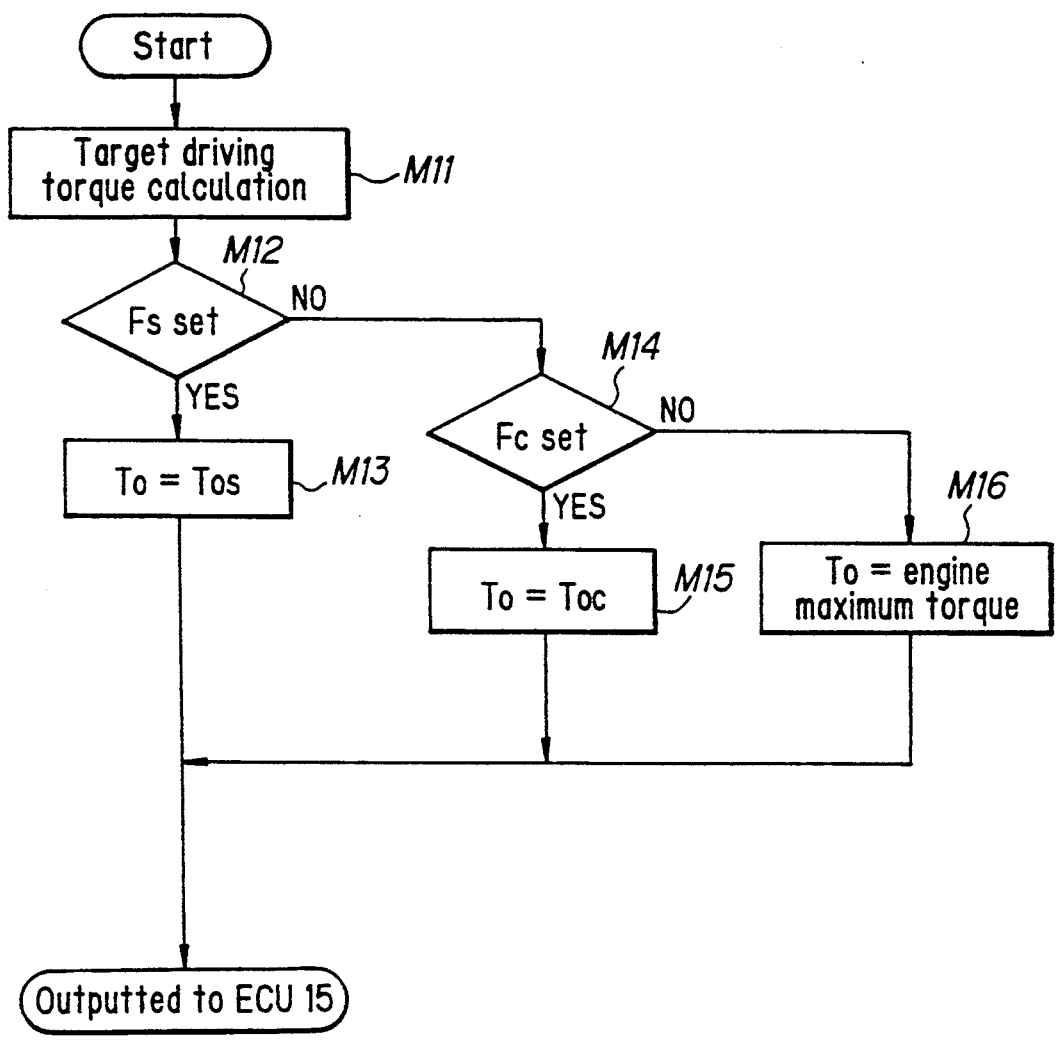
FIG. 34 is a flow chart showing final target torque selection flow.

As shown in FIG. 34 which shows this processing flow, after slip control target driving torque $T_{OS}$ and turning control target driving torque $T_{OC}$ are calculated in step M11, a determination is made in step M12 as to whether or not slip control flag $F_S$ is set. When it is determined that slip control flag $F_S$ is set, slip control target driving torque $T_{OS}$ is selected in step M13 as the final target driving torque $T_O$, and outputted to ECU 15.

When, in step M12, it is determined that slip control flag $F_S$ is not set, a determination is made in step M14 as to whether or not turning control flag $F_C$ is set. When it is determined that turning control flag $F_C$ is set, turning control target driving torque $T_{OC}$ is selected in step M15 as final target driving torque $T_O$, and outputted to ECU 15.

When, in step M14, it is determined that turning control flag $F_C$ is not set, TCL 76 in step M16 outputs a maximum torque of engine 11 as the final target driving torque $T_O$ to ECU 15.

In addition to the selection of the final target driving torque $T_O$ as indicated above, for a case where the vehicle starts abruptly or the road condition suddenly changes from a dry state to a frozen state, such that output reduction of engine 11 may be not fast enough by fully closing throttle valve 20 through actuator 41, TCL 76 sets in a retard angle ratio to the basic retard angle value $p_S$ of ignition timing P set by ECU 15, which is outputted to ECU 15.

Basic retard angle value $p_S$ is a maximum value of the retard angle that presents no problem relating to operation of engine 11. It is set according to the intake air amount and engine speed $N_E$ of engine 11. As the retard angle ratio, four levels are set in this embodiment: level O in which basic retard angle value is 0; level I in which basic retard angle value $p_s$ is compressed to two-thirds; level II in which basic retard angle value $p_S$ is outputted as is; and level III which basic retard angle value $p_S$ is outputted as is and throttle valve 20 is fully closed. Graphs of the retard angle ratio, in which the basic retard angle value increases as the changing rate of slip amount s increases, are stored in TCL 76.

Referring to FIG. 35 which shows the procedure to read the retard angle ratio, TCL 76 first resets ignition timing control flag $F_P$ in step P1. Subsequently, a determination is made in step P2 as to whether or not slip control flag $F_S$ is set. When it is determined in step P2 that slip control flag $F_S$ is set, ignition timing control flag $F_P$ is set in step P3. Subsequently, a determination is made in step P4 as to whether or not the slip amount s is smaller than 0 km per hour. When it is determined in step P2 that slip control flag $F_S$ is not set, processing proceeds to step P4.

When it is determined in step P4 that the slip amount s is smaller than 0 km per hour, that is, increasing driving torque of engine 11 presents no problem, the retard angle ratio is set to level O in step P5, which is outputted to ECU 15. To the contrary, when it is determined in step P4 that the slip amount s is greater than 0 km per hour, a determination is made in step P6 as to whether or not slip amount changing rate $G_S$ is smaller than 2.5 g. When it is determined in step P6 that slip amount changing rate $G_S$ is smaller than 2.5, a determination is made in step P7 as to whether or not retard angle ratio is at level III.

When it is determined in step P6 that slip amount changing rate $G_S$ exceeds 2.5 g, that is, front wheels 64 and 65 considerably slip, a determination is made in step P8 as to whether or not the final target driving torque $T_O$ is smaller than 4 kgm. When it is determined that the final target driving torque $T_O$ is smaller than 4 kgm, that is, the driving torque of engine 11 must be rapidly suppressed, the retard angle ratio is set in step P9 to level III, and processing proceeds to step P7. To the contrary, when it is determined in step P8 that the final target driving torque $T_O$ is greater than 4 kgm, nothing is done and processing proceeds to step P7.

When it is determined in step P7 that the retard angle ratio is that of level III, a determination is made in step P10 as to whether or not slip amount charging rate $G_S$ exceeds 0 g. When it is determined that slip amount changing rate $G_S$ exceeds 0 g, that is, the slip amount s tends to increase, a determination is made in step P11 as to whether or not ignition timing control flag $F_P$ is set. When it is determined in step P10 that slip amount changing rate $G_S$ is smaller than 0 g, that is, the slip amount s tends to decrease, a determination is made in step P12 as to whether or not the slip amount s exceeds 8 km per hour.

When it is determined in step P12 that the slip amount s exceeds 8 km per hour, processing proceeds to step P11. When it is determined that the slip amount s is smaller than 8 km per hour, the retard angle ratio is switched from level III to level II in step P13. Subsequently, a determination is made in step P14 as to whether or not slip amount changing rate $G_S$ is smaller than 0.5 g. Similarly, when it is determined in step P7 that the retard angle ratio is not at level III, processing also goes to step P14.

When it is determined in step P14 that slip amount changing rate $G_S$ is smaller than 0.5 g, that is, the change in the slip amount s is not very rapid, a determination is made in step P15 as to whether or not the retard angle ratio is at level II. When it is determined in step P14 that slip amount changing rate $G_S$ is not smaller than 0.5 g, the retard angle ratio is set in step P16 to level II, and processing proceeds to step P15.

When it is determined in step P15 that the retard angle ratio is at level II, a determination is made in step P16 as to whether or not slip amount changing rate $G_S$ exceeds 0 g. On the contrary, when it is determined that the retard angle ratio is not at level II, a determination is made in step P17 as to whether or not slip amount changing rate $G_S$ is smaller than 0.3 g. When it is determined in step P16 that slip amount changing rate $G_S$ does not exceed 0 g, that is, the slip amount s tends to decrease, a determination is made in step P18 as to whether or not the slip amount s exceeds 8 km per hour. When it is determined in step P18 that the slip amount s is smaller than 8 km per hour, the retard angle ratio is switched in step P19 from level II to level I. Subsequently, processing proceeds to step P17. When it is determined in step P16 that slip amount changing rate $G_S$ is greater than 0 g, that is, the slip amount s tends to increase, and when it is determined that the slip amount s is large, in the individual cases, processing proceeds to step P11.

When it is determined in step P17 that slip amount changing rate $G_S$ is smaller than 0.3 g, that is, the slip amount s almost does not tend to increase, a determination is made in step P20 as to whether or not the retard angle ratio is at level I. To the contrary, when it is determined in step P17 that slip amount changing rate $G_S$ exceeds 0.3 g, that is, the slip amount s tends to increase to some extent, the retard angle ratio is set to level I in step P21.

When it is determined in step P20 that the retard angle ratio is at level I, a determination is made in step P22 as to whether or not slip amount changing rate $G_S$ exceeds 0 g. Further, when it is determined to be less than 0 g, that is, the slip amount s tends to decrease, a determination is made in step P23 as to whether or not the slip amount s is smaller than 5 km per hour. When it is determined in step P23 that the slip amount s is smaller than 5 km per hour, that is, front wheels 64 and 65 are almost not slipping, the retard angle ratio is set to level 0 in step P24, which is outputted to ECU 15. When it is determined in step P20 that the retard angle ratio is not at level I; or, when it is determined in step P22 that slip amount changing rate $G_S$ exceeds 0 g, that is, the slip amount s tends to increase; or, when it is determined in step P23 that the slip amount s is greater than 5 km per hour, that is, the slip amount s is relatively large, the processing proceeds to step P11.

On the other hand, when it is determined in step P11 that ignition timing control flag $F_P$ is set, a determination is made in step P25 as to whether or not the final target driving torque $T_O$ is smaller than 10 kgm. When it is determined in step P11 that ignition timing control flag $F_P$ is not set, the retard angle ratio is set to level 0 in step P26 and processing goes to step P25.

When it is determined in step P25 that the final target driving torque $T_O$ is greater than 10 kgm, that is engine 11 generates a relatively high driving torque, a determination is made in step P27 as to whether or not the retard angle ratio is at level II. Further, when the retard angle ratio is determined to be at level II, the retard angle ratio is decreased to level I in step P28, which is outputted to ECU 15.

When it is determined in step P25 that the final target driving torque $T_O$ is smaller than 10 kgm, or, when it is determined in step P27 that the retard angle ratio is not at level II, a determination is made in step P29 as to whether or not hydraulic automatic transmission 13 is speed changing. When it is determined that hydraulic automatic transmission 13 is speed changing, a determination is made in step P30 as to whether or not the retard angle ratio is at level III. When it is determined in step P30 that the retard angle ratio is at level III, the retard angle ratio is decreased to level II in step P31, which is outputted to ECU 15. When it is determined in step P29 that hydraulic automatic transmission 13 is not speed changing, or, when it is determined in step P30 that the retard angle ratio is not at level III, the set retard angle ratio is outputted, as is, to ECU 15.

For example, when retard angle ratio of level III is set in step P9, when it is determined that slip amount changing rate $G_S$ exceeds 0 g and the slip amount s exceeds 8 km per hour, that is, the increasing rate of the slip amount s is rapid, and the final target driving torque $T_O$ is smaller than 10 kgm, and it is difficult to efficiently suppress slipping of front wheels 64 and 65 only by the retard angle operation of ignition timing, the retard angle ratio of level III is selected and opening of throttle valve 20 is forcibly fully closed. This thereby efficiently suppresses the occurrence of slip at its initial stage.

ECU 15 reads ignition timing P and basic retard angle $p_S$ according to a detection signal from crank angle sensor 62 and a detection signal from air flow sensor 70 from a graph (not shown) on ignition timing P and basic retard angle $p_S$ preset according to engine speed $N_E$ and intake air amount of engine 11, which are corrected according to a retard angle ratio transmitted from TCL 76 to calculate target retard angle $p_O$. In this case, an upper limit value of target retard angle $p_O$ is set according to an upper limit temperature not damaging to exhaust gas cleaning catalyst (not shown), and the exhaust gas temperature is detected from a detection signal from exhaust gas temperature sensor 74.

When the cooling water temperature detected by water temperature sensor 71 is lower than a predetermined value, since retardation of ignition timing P may induce knocking or stalling of engine 11, the retard angle operation of ignition timing P shown below is not performed.

Figure 36:
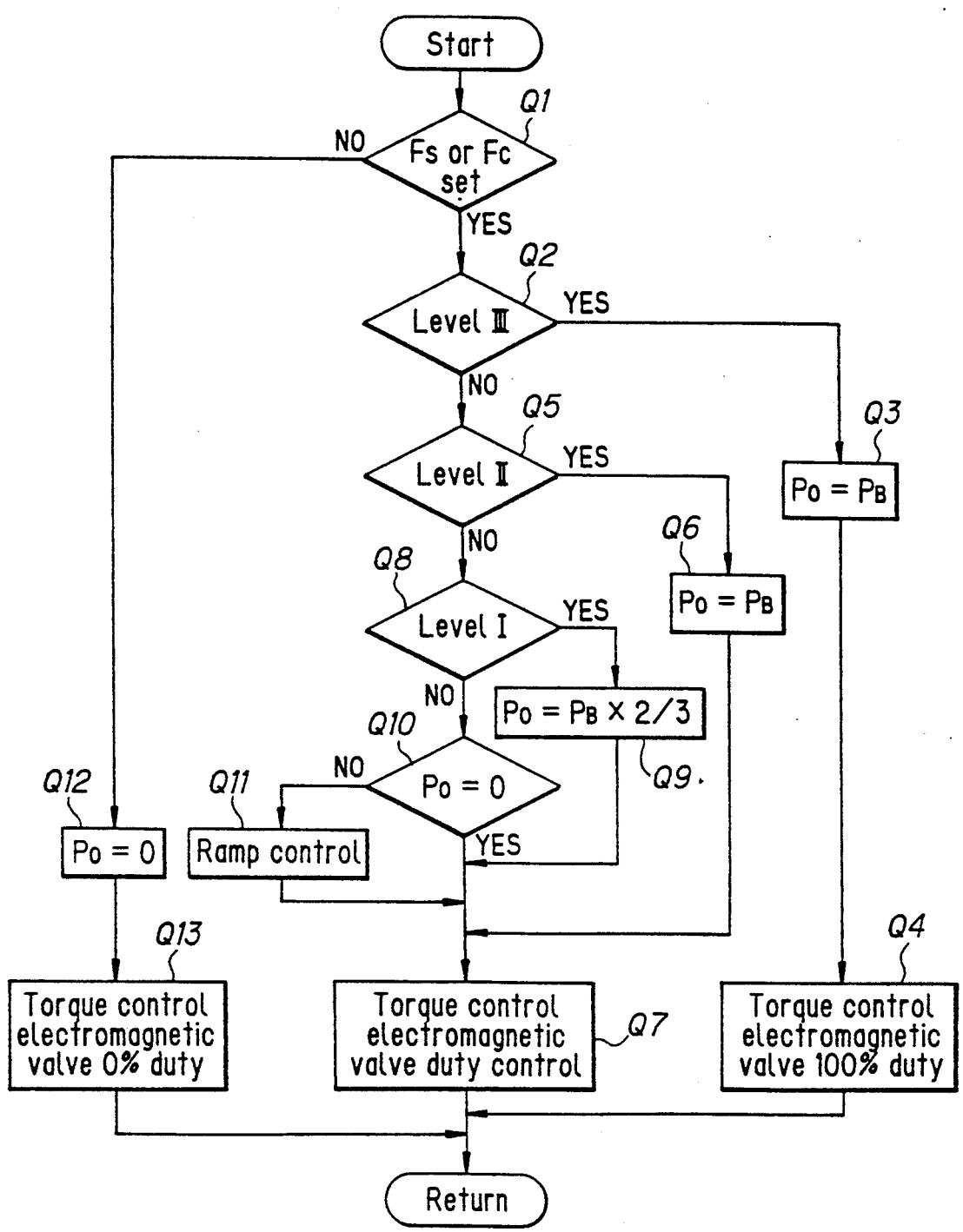
FIG. 36 is a flow chart showing an engine output control procedure.

Referring to FIG. 36, showing calculation procedure of the target retard angle $p_O$ in retard angle control, ECU 15 first determines in step Q1 whether or not slip control flag $F_S$ is set. When it is determined that slip control flag $F_S$ is set, a determination is made in step Q2 as to whether or not the retard angle ratio is set to level III.

When it is determined in step Q2 that the retard angle ratio is at level III, basic retard angle $p_S$ read from the graph is used, as is, as target retard angle $p_O$, and ignition timing P is retarded by target retard angle $p_O$. Furthermore, the duty ratio of torque control electromagnetic valves 51 and 56 is set to 100% so that throttle valve 20 is fully closed independent of the final target driving torque $T_O$, thereby forcibly achieving full-close state of throttle valve 20.

When it is determined in step Q2 that the retard angle ratio is not at level III, a determination is made in step Q5 as to whether or not the retard angle ratio is set to level II. When it is determined in step Q5 that the retard angle ratio is at level II, retard angle $p_O$ read from the graph is used, as is, in step Q6, as target retard angle $p_O$, as in step Q3, and ignition timing P is retarded by target retard angle $p_O$. Furthermore, ECU 15 sets in step Q7 the duty ratio of torque control electromagnetic valves 51 and 56 according to target driving torque $T_{OS}$, to thereby reduce the driving torque of engine 11 independent of the amount of pressure applied to the accelerator pedal 31 by the driver.

ECU 15 stores graphs to determine throttle opening $\theta_T$ from engine speed $N_E$ and driving torque of engine 11 as parameters, and ECU 15 reads target throttle opening $\theta_{TO}$ according to present engine speed $N_E$ and target driving torque $T_{OS}$ from the graphs.

Then ECU 15 determines deviation between target throttle opening $\theta_{TO}$ and actual throttle opening $\theta_T$ outputted from throttle opening sensor 67, sets the duty ratio of the pair of torque control electromagnetic valves 51 and 56 to a value, according to the deviation, to supply current to solenoids of plungers 52 and 57 of individual torque control electromagnetic valves 51 and 56. It further controls actual throttle opening $\theta_T$ to decrease to target throttle opening $\theta_{TO}$ by the operation of actuator 41.

When a maximum driving torque of engine 11 is outputted as target driving torque $T_{OS}$ to ECU 15, ECU 15 reduces the duty ratio of torque control electromagnetic valves 51 and 56 to the 0% side. This causes engine 11 to generate a driving torque according to the amount of pressure applied to the accelerator pedal 31 by the driver.

When it is determined in step Q5 that retard angle ratio is not at level II, a determination is made in step Q8 as to whether or not the retard angle ratio is set to level I. When it is determined in step Q8 that the retard angle ratio is set to level I, target retard angle $p_O$ is set to the following equation to retard ignition timing P by target retard angle $p_O$, and processing proceeds to step Q7.

$$p_O = p_S \cdot \frac{2}{3}$$

On the other hand, when it is determined in step Q8 that the retard angle ratio is not at level I, a determination is made in step Q10 as to whether or not retard angle $p_O$ is 0. When it is determined as 0, processing proceeds to step Q7 where ignition timing P is not retarded. The duty ratio of torque control electromagnetic valves 51 and 56 is thereby set according to target driving torque $T_O$ to reduce the driving torque of engine 11 independent of the amount of pressure applied to the accelerator pedal 31 by the driver.

When it is determined in step Q10 that retard angle $p_O$ is not 0, target retard angle $p_O$ is subtracted in step Q11 by ramp control, for example, by one degree every sampling period $\Delta t$ of the main timer, until $p_O=0$, to reduce shocks associated with driving torque changes of engine 11. Processing then proceeds to step Q7.

When it is determined in step Q1 that slip control flag $F_s$ is reset, ordinary running control is performed in which driving torque of engine 11 is not reduced, $p_O=0$ is set in step Q12 and ignition timing P is not retarded. The duty ratio of torque control electromagnetic valves 51 and 56 is set to 0% in step Q13 to cause engine 11 to generate a driving torque according to the amount of pressure applied to the accelerator pedal 31 by the driver.

The above-described retard angle ratio setting area can be varied according to running characteristics and the like of vehicle 82.

From the above-described embodiments of the present invention, it is apparent that the present invention may be modified as would occur to one of ordinary skill in the art without departing from the scope of the present invention, which should be defined solely by the appended claims. Changes and modifications of the system contemplated by the present preferred embodiments will be apparent to one of ordinary skill in the art and thus are included as being encompassed by the present invention as solely defined by the appended claims.

What is claimed is:

1. An output control apparatus for a vehicle comprising:
   torque reduction means for reducing driving torque independent of manipulation by the driver;
   operating speed detecting means for detecting an operating speed of the vehicle;
   reference torque setting means for calculating an actual longitudinal direction acceleration of a vehicle body from said detected operating speed of the vehicle to set a reference driving torque for the engine;

target driving torque setting means for correcting said reference driving torque according to a slip amount of at least one of the driving wheels of the vehicle to set a target driving torque for the engine;

a torque control unit for equating the actual driving torque to said target driving torque set by said target driving torque setting means by controlling operation of said torque reduction means; and filter means for correcting, for each of a plurality of control cycles, the calculated actual longitudinal direction acceleration and for outputting, for each of said plurality of control cycles, a corrected longitudinal direction acceleration, varying with a predetermined delay time according to changes in said calculated actual longitudinal direction acceleration, and for maintaining the output corrected longitudinal direction acceleration, upon a power transmission apparatus of the vehicle being shifted, at a value above the output corrected longitudinal direction acceleration immediately preceeding that of the shift, wherein said reference torque setting means sets said reference driving torque according to said output corrected longitudinal direction acceleration.

2. The output control apparatus of claim 1 wherein said slip amount of at least one of the vehicle driving wheels is calculated based upon a difference between actual driving wheel speed as an actual peripheral speed of the driving wheels, and reference driving wheel speed calculated corresponding to said operating speed of the vehicle as a reference peripheral speed of the driving wheels.

3. The output control apparatus of claim 1 wherein said predetermined delay time is varied according to at least one of a slip condition of at least one of the driving wheels and said calculated longitudinal direction acceleration of the vehicle.

4. The output control apparatus of claim 1 wherein said corrected longitudinal direction acceleration is periodically corrected and outputted from said filter means according to changes in said actual longitudinal direction acceleration, with said predetermined delay time, upon said actual longitudinal direction acceleration, inputted to said filter means in a present control cycle, being greater than said corrected longitudinal direction acceleration, outputted from said filter means in a previous control cycle, and upon determining that said corrected longitudinal direction acceleration outputted from said filter means in the previous control cycle is greater than said actual longitudinal direction acceleration inputted to said filter means in the present control cycle, wherein said corrected longitudinal direction acceleration in the previous control cycle is decreased by a predetermined value and outputted from said filter means as said corrected longitudinal direction acceleration in the present control cycle when said slip amount of the driving wheels is positive, and, said corrected longitudinal direction acceleration in the previous control cycle is maintained and outputted from said filter means as said corrected longitudinal direction acceleration in the present control cycle when said slip amount of the driving wheels is negative.

5. The output control apparatus for a vehicle of claim 1 wherein said longitudinal direction acceleration of the vehicle body is one of said corrected longitudinal direction acceleration outputted from said filter means in a previous control cycle and said actual longitudinal direction acceleration inputted to said filter means in a present control cycle.

6. The output control apparatus of claim 5 wherein said predetermined delay time is reduced to a shorter period of time when said corrected longitudinal direction acceleration outputted from said filter means in a previous control cycle is greater than said actual longitudinal direction acceleration inputted to said filter means in a present control cycle, as compared to that of the corrected longitudinal direction acceleration outputted from said filter means in the previous control cycle being smaller than said actual longitudinal direction acceleration inputted to said filter means in the present control cycle.

7. The output control apparatus of claim 1, wherein the operating speed $V_S$ of the vehicle is calculated by the equation $V_S=(K_V \cdot V_L)+(1-K_V) \cdot V_H$—, wherein $V_H$ is a greater peripheral speed of right and left driven wheels, $V_L$ is a smaller peripheral speed of the right and left driven wheels, and $K_V$ is a weighting factor of a value between 0 and 1.

8. The output control apparatus of claim 7, wherein said weighting factor $K_V$ is varied in value according to an average value of the peripheral speeds of the right and left driven wheels.

9. The output control apparatus of claim 2, wherein said predetermined delay time is varied according to at least one of a slip condition of at least one of the driving wheels and said calculated longitudinal direction acceleration of the vehicle.

10. The output control apparatus of claim 2, wherein said corrected longitudinal direction acceleration is periodically corrected and output from said filter means according to changes in said actual longitudinal direction acceleration, with said predetermined delay time, upon said actual longitudinal direction acceleration, inputted to said filter means in a present control cycle, being greater than said corrected longitudinal direction acceleration, outputted from said filter means in a previous control cycle, and upon determining that said corrected longitudinal direction acceleration outputted from said filter means in the previous control cycle is greater than said actual longitudinal direction acceleration inputted to said filter means in the present control cycle, wherein said corrected longitudinal direction acceleration in the previous control cycle is decreased by a predetermined value and outputted from said filter means as said corrected longitudinal direction acceleration in the present control cycle when said slip amount of the driving wheel is positive, and, said corrected longitudinal direction acceleration in the previous control cycle is maintained and outputted from said filter means as said corrected longitudinal direction acceleration in the present control cycle when said slip amount of the driving wheels is negative.

11. The output control apparatus for a vehicle of claim 2, wherein said longitudinal direction acceleration of the vehicle body is one of said corrected longitudinal direction acceleration outputted from said filter means in a previous control cycle and said actual longitudinal direction acceleration inputted to said filter means in a present control cycle.

12. The output control apparatus of claim 11, wherein said predetermined delay time is reduced to a shorter period of time when said corrected longitudinal direction acceleration outputted from said filter means in the previous control cycle is greater than said actual longitudinal direction acceleration inputted to said filter means in the present control cycle, as compared to that of the corrected longitudinal direction acceleration outputted from said filter means in the previous control cycle being smaller than said actual longitudinal direction acceleration inputted to said filter means in the present control cycle.

13. The output control apparatus of claim 11, wherein the operating speed $V_S$ of the vehicle is calculated by the equation $V_S=(K_V \cdot V_L)+(1-K_V) \cdot V_H$—, wherein $V_H$ is a greater peripheral speed of right and left driven wheels, $V_L$ is a smaller peripheral speed of the right and left driven wheels, $K_V$ is a weighting factor of a value between 0 and 1.

14. The output control apparatus of claim 13, wherein said weighting factor $K_V$ is varied in value according to an average value of the peripheral speeds of the right and left driven wheels.

15. The output control apparatus of claim 3, wherein said corrected longitudinal direction acceleration is periodically corrected and output from said filter means according to changes in said actual longitudinal direction acceleration, with said predetermined delay time, upon said actual longitudinal direction acceleration, inputted to said filter means in a present control cycle, is greater than said corrected longitudinal direction acceleration, outputted from said filter means in a previous control cycle, and upon determining that said corrected longitudinal direction acceleration outputted from said filter means in the previous control cycle is greater than said actual longitudinal direction acceleration inputted to said filter means in the present control cycle, wherein said corrected longitudinal direction acceleration in the previous control cycle is decreased by a predetermined value and outputted from said filter means as said corrected longitudinal direction acceleration in the present control cycle when said slip amount of the driving wheels is positive, and said corrected longitudinal direction acceleration in the previous control cycle is maintained and outputted from said filter means as said corrected longitudinal direction acceleration in the present control cycle when said slip amount of the driving wheels is negative.

16. The output control apparatus for a vehicle of claim 3, wherein said longitudinal direction acceleration of the vehicle body is one of said corrected longitudinal direction acceleration outputted from said filter means in the previous control cycle and said actual longitudinal direction acceleration inputted to said filter means in the present control cycle.

17. The output control apparatus of claim 16, wherein said predetermined delay time is reduced to a shorter period of time when said corrected longitudinal direction acceleration outputted from said filter means in the previous control cycle is greater than said actual longitudinal direction acceleration inputted to said filter means in the present control cycle, as compared to that of the corrected longitudinal direction acceleration outputted from said filter means in the previous control cycle being smaller than said actual longitudinal direction acceleration inputted to said filter means in the present control cycle.

18. The output control apparatus of claim 3, wherein the operating speed $V_S$ of the vehicle is calculated by the equation $V_S=K_V \cdot V_L)+(1-K_V) \cdot V_H$, wherein $V_H$ is a greater peripheral speed of right and left driven wheels, $V_L$ is a smaller peripheral speed of the right and left driven wheels, $K_V$ is a weighting factor of a value between 0 and 1.

19. The output control apparatus of claim 18, wherein said weighting factor $K_V$ is varied in value according to an average value of the peripheral speeds of the right and left driven wheels.

20. The output control apparatus for a vehicle of claim 4, wherein said longitudinal direction acceleration of the vehicle body is one of said corrected longitudinal direction acceleration outputted from said filter means in the previous control cycle and said actual longitudinal direction acceleration inputted to said filter means in the present control cycle.

21. The output control apparatus of claim 20, wherein said predetermined delay time is reduced to a shorter period of time when said corrected longitudinal direction acceleration outputted from said filter means in the previous control cycle is greater than said actual longitudinal direction acceleration inputted to said filter means in the present control cycle, as compared to that of the corrected longitudinal direction acceleration outputted from said filter means in the previous control cycle being smaller than said actual longitudinal direction acceleration inputted to said filter means in the present control cycle.

22. The output control apparatus of claim 4, wherein the operating speed $V_S$ of the vehicle is calculated by the equation $V_S=(K_V \cdot V_L)+(1-K_V) \cdot V_H$, wherein $V_H$ is a greater peripheral speed of right and left driven wheels, $V_L$ is a smaller peripheral speed of the right and left driven wheels, $K_V$ is a weighting factor of a value between 0 and 1.

23. The output control apparatus of claim 22, wherein said weighting factor $K_V$ is varied in value according to an average value of the peripheral speeds of the right and left driven wheels, 24. The output control apparatus of claim 5, wherein the operating speed $V_S$ of the vehicle is calculated by the equation $V_S=K \cdot V_L+(K_V \cdot V_L)+(1-K_V) \cdot V_H$ wherein $V_H$ is a greater peripheral speed of right and left driven wheels, $V_L$ is a smaller peripheral speed of the right and left driven wheels, $K_V$ is a weighting factor of a value between 0 and 1.

25. The output control apparatus of claim 24, wherein said weighting factor $K_V$ is varied in value according to an average value of the peripheral speeds of the right and left driven wheels.

26. The output control apparatus of claim 6, wherein the operating speed $V_S$ of the vehicle is calculated by the equation $V_S=(K_V \cdot V_L)+(1-K_V) \cdot V_H$ wherein $V_H$ is a greater peripheral speed of right and left driven wheels, $V_L$ is a smaller peripheral speed of the right and left driven wheels, $K_V$ is a weighting factor of a value between 0 and 1.

27. The output control apparatus of claim 26, wherein said weighting factor KV is varied in value according to an average value of the peripheral speeds of the right and left driven wheels.

28. An output control method for a vehicle comprising the steps of:
(a) detecting an operating speed of the vehicle;
(b) calculating an actual longitudinal direction acceleration of a vehicle body from the detected operating speed of the vehicle to set a reference driving torque for the engine;
(c) correcting said reference driving torque according to a slip amount of at least one of the driving wheels of the vehicle to set a target driving torque for the engine;

(d) equating the actual driving torque to the target driving torque set in said step (c) by controlling driving torque independent of manipulation by the driver; and (e) correcting, for each of a plurality of control cycles, the calculated actual longitudinal direction acceleration and outputting, for each of the plurality of control cycles, a corrected longitudinal direction acceleration, varying with a predetermined delay time according to changes in the calculated actual longitudinal direction acceleration, and maintaining and outputting the corrected longitudinal direction acceleration upon a power transmission apparatus of the vehicle being shifted, at a value above the output corrected longitudinal direction acceleration immediately preceeding that of the shift, wherein said step (b) of calculating sets the reference driving torque according to the output corrected longitudinal direction acceleration.

29. The output control of claim 28, wherein the slip amount of at least one of the vehicle driving wheels of step (c) is calculated based upon a difference between actual driving wheel speed as an actual peripheral speed of the driving wheels, and reference driving wheel speed calculated corresponding to the operating speed of the vehicle as a reference peripheral speed of the driving wheels.

30. The output control method of claim 28, wherein the predetermined delay time of step (e) is varied according to at least one of a slip condition of at least one of the driving wheels and the calculated longitudinal direction acceleration of the vehicle.

31. The output control method of claim 30, wherein the corrected longitudinal direction acceleration of step (e) is periodically corrected and outputted according to changes in the actual longitudinal direction acceleration, with the predetermined delay time, upon the actual longitudinal direction acceleration, in a present control cycle, is greater than said corrected longitudinal direction acceleration, outputted in a previous control cycle, and upon determining that the corrected longitudinal direction acceleration in the previous control cycle is greater than the actual longitudinal direction acceleration in the present control cycle, wherein the corrected longitudinal direction acceleration in the previous control cycle is decreased by a predetermined value and as the corrected longitudinal direction acceleration in the present control cycle when the slip amount of the driving wheels is positive, and, the corrected longitudinal direction acceleration in the previous control cycle is maintained and as the corrected longitudinal direction acceleration in the present control cycle when the slip amount of the driving wheels is negative.

32. The output control method for a vehicle of claim 28, wherein the longitudinal direction acceleration of the vehicle body is one of the corrected longitudinal direction acceleration in a previous control cycle and the actual longitudinal direction acceleration in a present control cycle.

33. The output control method of claim 32, wherein the predetermined delay time of step (e) is reduced to a shorter period of time when the corrected longitudinal direction acceleration in the previous control cycle is greater than the actual longitudinal direction acceleration in the present control cycle, as compared to that of the corrected longitudinal direction acceleration in the previous control cycle being smaller than the actual longitudinal direction acceleration in the present control cycle.

34. The output control method of claim 28, wherein the operating speed $V_S$ of the vehicle is calculated in step (c) by the equation $V_S=(K_V \cdot V_L)+(1-K_V) \cdot V_H$, wherein $V_H$ is a greater peripheral speed of right and left driven wheels, $V_L$ is a smaller peripheral speed of the right and left driven wheels, $K_V$ is a weighting factor of a value between 0 and 1.

* * * * *